United States Patent [19]

Fukawa

[11] Patent Number: 4,914,452

[45] Date of Patent: Apr. 3, 1990

[54] INK SHEET/RECORDING PAPER CASSETTE

[75] Inventor: Kazumi Fukawa, Asaka, Japan

[73] Assignee: Ricoh Company, Ltd., Tokyo, Japan

[21] Appl. No.: 191,059

[22] Filed: May 6, 1988

[30] Foreign Application Priority Data

| | | | |
|---|---|---|---|
| May 8, 1987 | [JP] | Japan | 62-112134 |
| May 8, 1987 | [JP] | Japan | 62-112135 |
| May 8, 1987 | [JP] | Japan | 62-112136 |
| Jul. 14, 1987 | [JP] | Japan | 62-108685[U] |
| Jul. 14, 1987 | [JP] | Japan | 62-108686[U] |

[51] Int. Cl.[4] .......... G01D 15/10

[52] U.S. Cl. .......... 346/76 PH; 400/120; 400/207

[58] Field of Search .......... 346/76 PH; 400/120 PH, 400/207

[56] References Cited

FOREIGN PATENT DOCUMENTS 0250976 12/1985 Japan .......... 400/120

*Primary Examiner*—Teresa J. Walberg
*Assistant Examiner*—Huan Tran
*Attorney, Agent, or Firm*—Oblon, Spivak, McClelland, Maier & Neustadt

[57] ABSTRACT

An ink sheet/recording paper cassette for use in a thermal printer includes a case in which a roll of an ink sheet and a roll of recording paper are contained. A take-up spool is also provided in the case and the leading end of the ink sheet is fixedly attached to the take-up spool so that the ink sheet when supplied from the roll is used for recording information on the recording paper supplied from the roll and then wound around the take-up spool. The provision of a roll of an ink sheet and a roll of recording paper in the same cassette case significantly eases handling of expandable supplies of a thermal printer.

15 Claims, 20 Drawing Sheets

INK SHEET/RECORDING PAPER CASSETTE

BACKGROUND OF THE INVENTION

1. Field of the Invention

This invention generally relates to an ink sheet cassette containing therein a quantity of ink sheet for use in a thermal transfer printer, and in particular to an ink sheet/recording paper cassette containing therein both a roll of ink sheet and a roll of recording paper for use in a thermal transfer printer as detachably mounted therein.

2. Description of the Prior Art

Recently, as an image recording apparatus for use in a facsimile or the like, an image recording apparatus using a thermal print head has been widely used and various such image recording apparatuses have been marketed because of simplicity in structure and mechanism and low at cost. A typical prior art image recording apparatus 1 of this type is schematically shown in FIG. 18 and it includes a main housing la which houses therein a roll of ink sheet 2, a roll of recording paper 3, a guide roller 4, a separation roller 5, a take-up spool 6, a thermal print head 7, a platen roller 8 and a cutter unit 9. As the ink sheet 2, use is, for example, made of an ink sheet which includes a base sheet of polyester of a few microns thick and a thermally transferable ink layer formed on the base sheet, and the ink sheet 2 normally has a width larger than that of the recording paper 3 and initially wound around a supply spool *2a*. The roll of ink sheet 2 is mounted on a support structure (not shown) and it is wound from the roll and wound around the take-up spool 6 after moving past the guide roller 4 and the separation roller 5.

The support structure of the roll of ink sheet 2 is provided with a back tension mechanism (not shown) so that a predetermined tension is maintained in that portion of the ink sheet 2 which has been unwound from the roll to thereby prevent the occurrence of creases in the ink sheet 2. The take-up spool 6 is coupled to a take-up mechanism (not shown) and it takes up the ink sheet 2, which has been presented for recording, in association with the rotation of the platen roller 8. The take-up mechanism is provided with a one-way clutch mechanism which serves to take up the ink sheet 2 when the platen roller 8 is driven to rotate in the direction for supplying the recording paper 3 and on the other hand which also serves to prevent taking up of the ink sheet 2 when the platen roller 8 rotates in the direction for moving the recording paper 3 back toward the thermal print head 7. The recording paper 3 is typically a sheet of plain paper which is initially provided in the form of a roll as wound around a shaft *3a* which in turn is rotatably supported in position by means of a support structure (not shown). The recording paper 3 is unwound from the roll and is supplied between the thermal print head 7 and the platen roller 8 as guided by the guide roller 4, together with the ink sheet 2.

As well known in the art, the thermal print head 7 is provided with a plurality of heat-producing (or resistor) elements arranged in the form of a single array at a predetermined pitch (not shown), which are selectively activated to produce a heat pattern in accordance with image information supplied from a control unit, whereby the ink layer of the ink sheet 2 is selectively melted and then transferred to the recording paper 3 in contact with the ink sheet 2 to effect recording line by line while the recording paper 3 is in contact with the ink sheet 2 as sandwiched between the thermal print head 7 and the platen roller 8. Upon completion of thermal transfer recording, the ink sheet 2 is separated away from the recording paper 3 by means of the separation roller 5 which is located downstream of the thermal print head 7 with respect to the direction of advancement of the ink sheet 2 and also the recording paper 3, so that the ink sheet 2 is wound around the take-up spool 6 and on the other hand the recording paper 3 advances into the cutter unit 9. Thus, the recording paper 3 is cut into a sheet of predetermined size by the cutter unit 9 and the thus cut sheet of recording paper 3 is discharged out of the present image recording apparatus.

Each of the ink sheet 2 and the recording paper 3 is provided with an end mark at its end and these end marks may be detected by end mark sensors (not shown) provided in the image recording apparatus. It should be noted that also provided in the structure shown in FIG. 18 are paper guide plates for guiding the advancement of the recording paper 3 along a predetermined paper transportation path defined in the image recording apparatus; however, no reference numerals are assigned to these paper guide plates in FIG. 18. Upon cutting of the recording paper by the cutter unit 9, the platen roller 3 is typically driven to rotate in the reversed direction to cause the recording paper 3 move back toward the thermal print head 7 over a predetermined length to thereby set the leading margin at around 2 mm so as to minimize the waste of recording paper 3.

In such a typical prior art thermal transfer type recording apparatus, the ink sheet 2 and the recording paper 3 are typically mounted in position separately, and thus replacement of either one of both of these components tends to be complicated in procedure and thus difficult to carry out. That is, when it is desired to carry out replacement of ink sheets 2, the supply spool *2a* and the take-up spool 6 are detached from the support structure and a new roll of ink sheet 2 is set in position in the support structure, whereby the new ink sheet 2 must be passed around the guide roller 4 and the separation roller 5 and the take-up spool 6 to which the leading end of the ink sheet 2 is fixedly attached must be set in position in the take-up mechanism. In the case where the recording paper 3 is to be replaced with a new roll, the shaft *3a* carrying no more recording paper 3 is removed from the support structure and a new roll of recording paper 3 is set in position in the support structure, followed by the steps of unwinding the leading end of the recording paper 3, passing the leading end around the guide roller 4 and inserting the leading end through the cutter unit 9. In particular, when mounting a new ink sheet 2 in position, if the operator touches the ink layer of the ink sheet 2 by a hand or fingers, the ink layer may be locally removed while the hand or fingers of the operator get stained. Besides, since the ink sheet 2 is normally extremely thin, creases may be formed in the unwound portion of the ink sheet 2 when the ink sheet 2 is not properly set in position.

If the ink layer of the ink sheet 2 is locally removed or creases are present in the unwound portion of the ink sheet 2 as described above, image information may be partially lost when recorded with such an ink sheet 2 or the resulting recorded image may become poor in quality. For this reason, an extremely careful attention is required in handling the ink sheet 2 of this type of recording apparatus. Moreover, it is required to provide a separate end detecting sensor for each of the ink sheet 2 and the recording paper 3, so that the overall size of the recording apparatus is hindered to make compact in size and it also hinders to lower the overall cost. Besides, it is also required to provide an end mark in each of the ink sheet 2 and the recording paper 3 separately so that manufacture of such an ink sheet 2 and recording paper 3 tends to become expensive since an extra step of providing an end mark is required for each of ink sheet 2 and recording paper 3.

Furthermore, plain paper and heat-sensitive paper for use as the recording paper 3 look similar, so that, for example, when switching from a thermal transfer recording mode using plain paper to a direct recording mode using heat-sensitive paper, the operator may often forget to replace the recording paper 3 of plain paper with heat-sensitive recording paper after removal of the ink sheet 2. The operator may also mount plain paper in position while believing it to be heat-sensitive paper. In such a case, image information is not recorded and could be lost.

SUMMARY OF THE INVENTION

In accordance with one aspect of the present invention, there is provided an ink sheet/recording paper cassette which may be detachably mounted in position in an image recording apparatus, such as a facsimile machine or the like. The ink sheet/recording paper cassette includes a cassette housing which contains therein a roll of recording paper, a roll of ink sheet and a take-up means for taking up an ink sheet unwound from the roll of ink sheet after having been used for recording. The roll of ink sheet is rotatably supported in the cassette housing and the roll of recording paper is also rotatably supported in the cassette housing. With this structure, mounting and dismounting of the ink sheet and the recording paper can be carried out at the same time, which is extremely advantageous for the operator.

In accordance with another aspect of the present invention, there is provided an image recording apparatus in which an ink sheet/recording paper cassette which houses therein both of a roll of ink sheet and a roll of recording paper may be detachably mounted. The image recording apparatus includes a first rotational force transmitting means for transmitting a rotational force in a predetermined direction of a platen roller to a taking up means for taking up the ink sheet and a second rotational force transmitting means for transmitting a rotational force in the reversed direction of the platen roller to the taking up means to thereby move the ink sheet backward over a predetermined direction.

In accordance with a further aspect of the present invention, there is provided an ink sheet/recording paper cassette which contains a roll of recording paper, a roll of ink sheet, an ink sheet take-up spool and rotational force transmitting means for transmitting a rotational force supplied from an image recording apparatus in which the cassette is detachably mounted to the take-up spool. The cassette is also provided with an ink sheet roll support structure which applies a load to the ink sheet in the direction opposite to the supply direction of the ink sheet so as to keep the ink sheet unwound from the roll in tension.

In accordance with a still further aspect of the present invention, there is provided an ink sheet cassette for use in an image recording apparatus as detachably mounted in position therein and the ink sheet cassette includes a cassette housing which houses therein a roll of ink sheet, a take-up spool for taking up the ink sheet after having been used for recording at a predetermined recording position where the ink sheet is brought into contact with recording paper and separating means disposed between the recording position and the take-up spool for separating the ink sheet from the recording paper after recording. The separating means is preferably formed from a rotatably supported roller.

In accordance with a still further aspect of the present invention, there is provided an ink sheet/recording paper cassette including a cassette housing which houses therein a roll of recording paper, a roll of ink sheet, a take-up spool to which a leading end of the ink sheet is fixedly attached, and holding means for holding a leading end of the recording paper.

It is therefore a primary object of the present invention to obviate the disadvantages of the prior art as described above and to provide an improved ink sheet cassette for use in an image recording apparatus as detachably mounted therein.

Another object of the present invention is to provide an improved ink sheet/recording paper cassette which contains both of a roll of recording paper and a roll of ink sheet.

A further object of the present invention is to provide an image recording apparatus which includes an ink sheet/recording paper cassette as detachably mounted therein.

A still further object of the present invention is to provide an improved ink sheet/recording paper cassette which allows to facilitate component replacement operation and to eliminate waste of ink sheet and/or recording paper.

Other objects, advantages and novel features of the present invention will become apparent from the following detailed description of the invention when considered in conjunction with the accompanying drawings.

DESCRIPTION OF THE PREFERRED EMBODIMENTS

Figure 1:
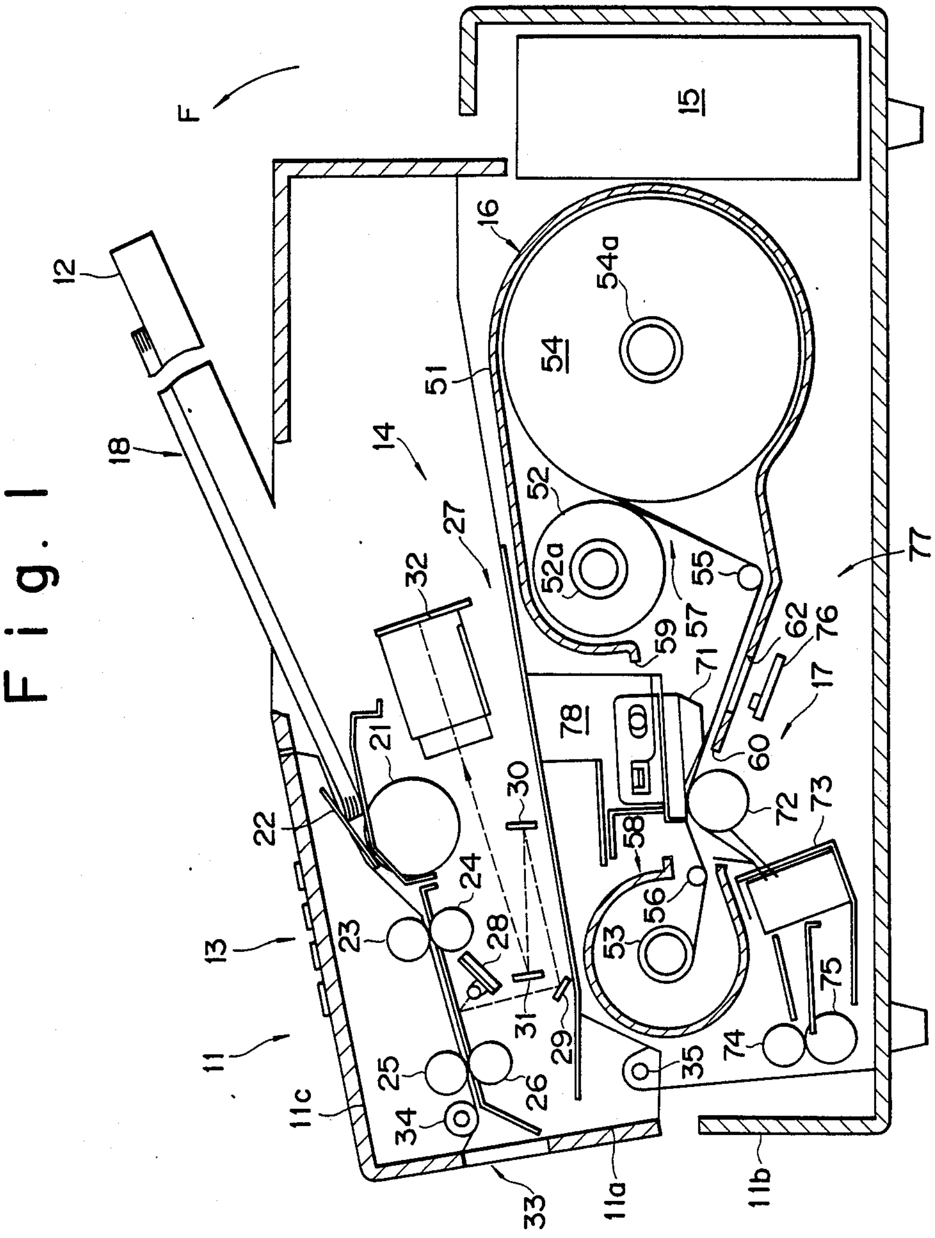
FIG. 1 is a schematic illustration showing the overall structure of a facsimile machine constructed in accordance with one embodiment of the present invention.

Referring now to FIG. 1, there is schematically shown a facsimile machine 11 constructed in accordance with one embodiment of the present invention. As shown, the facsimile machine 11 is generally divided into upper and lower half sections 11a and 11b, respectively. The upper section 11a includes an original table 12, a control panel 13 and an original reading unit 14; whereas, the lower section 11b includes a control unit 15, an ink sheet/recording paper cassette 16 and a recording unit 17. It is to be noted that for the sake of convenience the ink sheet/recording paper cassette 16 will also be simply referred to as an ink sheet cassette. The original table 12 is a table for placing thereon one or more of originals 18 to be transmitted as stacked. The control panel 13 is provided with various switches, keys and display units for providing operational commands to each component of the facsimile machine 11 through the control unit 15.

In the illustrated embodiment, the original reading unit 14 includes an automatic document feeder roller or simply ADF roller 21 for feeding originals stacked on the table 12 one by one automatically, a separation rubber plate 22 for separating the bottom-most original from the stack of originals so as to secure that only one original is supplied at a time, a plurality of transport rollers 23–26 for transporting the original along a predetermined original transportation path and a reading means 27. The ADF roller 21 is driven to rotate in a predetermined direction by a driving source (not shown) to thereby feed the bottom-most original in the stack of originals to a reading station. The transport rollers 23–26 are driven to rotate all at the same speed to transport the original 18 supplied from the ADF roller 21 through the reading station at a predetermined speed, thereby effecting the so-called auxiliary scanning.

The reading means 27 for optically reading the original moving past the reading station as described above includes a light source 28, mirrors 29–31 and a line image sensor 32. Use may be preferably made of a fluorescent lamp as the light source 28 and it illuminates the original 18 across its widthwise direction. The light emitted from the light source 28 is reflected at the original 18 and impinges on the line image sensor 32 after reflection by the mirrors 29–31. The line image sensor 32 is, for example, is comprised of a photoelectric device, such as a CCD, which optically scans the original 18 being transported by the transport rollers 23–26 line by line in the widthwise direction of the original 18 from its leading edge to its trailing edge. The line image sensor 32 converts the optical image information into electrical image information which is then supplied to the control unit 15. Upon completion of reading of the original 18 by the reading means 27, the original 18 is discharged out of the facsimile machine 11 through an original discharge port 33 by means of the transport rollers 25 and 26 and thus placed on a paper discharge tray (not shown).

In the vicinity of the paper discharge port 33 of the upper section 11a is provided an upper support pivot 34 and a portion of the upper section 11a, which includes the control panel 13, may be pivoted open or closed around the upper support pivot 34 with respect to the rest. When the pivotal portion of the upper section 11a is pivoted open, it provides an easy access to the original reading unit 14. In addition, a lower support pivot 35 is provided below the upper support pivot 34 and the upper half section 11a as a whole may be pivotted around the lower support pivot 35 relative to the lower half section 11b. As a result, the upper and lower half sections 11a and 11b may be pivotted open and closed by pivotally moving the upper half section 11a around the lower support pivot 35 relative to the lower half section 11b which remains stationary.

Figure 2:
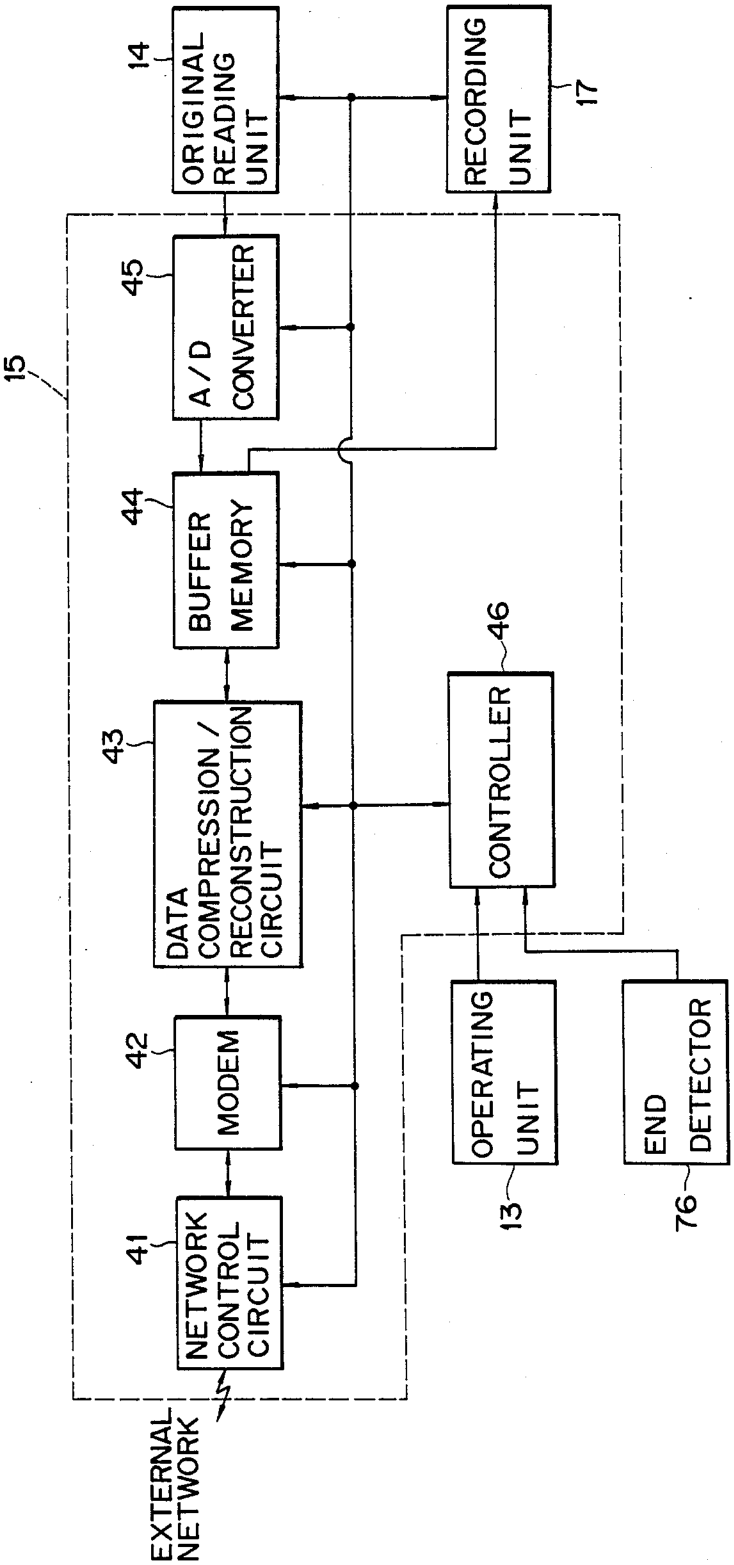
FIG. 2 is a block diagram showing the overall structure of an image processing system incorporated in the facsimile machine of FIG. 1.

As shown in FIG. 2, the control unit 15 includes a network control circuit 41, a MODEM 42, a data compression/reconstruction circuit 43, a buffer memory 44, an A/D converter circuit 45 and a control circuit 46. The network control circuit 41 is often referred to as AA-NCU and it places a call to a destination station automatically and receives a call automatically from the external transmission line. The MODEM 42 modulates the image information of originals 18 which have been processed and digitized within the control unit 15 for transmission to a destination station through the external transmission line and also demodulates a modulated signal received from the external transmission line to thereby extract a digital signal. The data compression/reconstruction circuit 43 is provided for shortening the transmission time of image information to thereby carry out efficient data transmission, and when the present facsimile machine operates as a transmitter, image information is compressed by coding; whereas, when the present facsimile machine operates as a receiver, the compressed image information as received is decompressed to thereby reconstruct the original image information. The buffer memory 44 stores the image information from the original reading unit 14, which has been binary converted by the A/D converter circuit 45, for every predetermined number of lines (e.g., one line by one line) and supplies the thus stored information to the data compression/reconstruction circuit 43 and at the same time the image information reconstructed in the form of the original information at the data compression/reconstruction circuit 43 is stored for every predetermined number of lines and then output to the recording unit 17.

The A/D converter circuit 45 carries out conversion between an analog signal and a corresponding digital signal and it converts one line of image information (analog signal) supplied from the original reading unit 14 into image information (digital signal) which may be processed at the control unit 15. The control circuit 46 is provided, for example, with a CPU, ROM, RAM or the like and it systematically controls the operation of the present facsimile machine 11 based on various signals, including command signals from the control panel 13, signals from a later-described end detecting sensor 76 and various other sensors (not shown) and image information transmitted along the external transmission line.

Returning to FIG. 1, the ink sheet cassette 16 is detachably mounted in position in the present facsimile machine 11 and it includes a cassette housing or case 51 which contains therein a roll of ink sheet 52, a take-up spool 53, a roll of recording paper 54 and guide rollers 55 and 56. The cassette case 51 may, for example, be formed from a resin material, such as an ABS resin material, and the interior of the cassette case 51 is generally divided into two regions: (1) a supply region 57 in which the roll of ink sheet 52, the roll of recording paper 54 and the guide roller 55 are provided and (2) a take-up region in which the take-up spool 53 and the guide roller 56 are provided. Each of these supply and take-up regions 57 and 58 is shaped such that any component provided therein is not touched by hands during handling. Thus, all of the components provided in each of the supply and take-up regions 57 and 58 are protected and not adversely affected by handling. The supply region 57 is spaced apart from the take-up region 58 over a predetermined spacing, and such spacing is set such that a thermal print head 71 of the recording unit 17 and a platen roller 72 may enter the cassette 16. The cassette case 51 is formed with an opening 59 at its top in FIG. 1 between the supply region 57 and the take-up region 58 and it is so sized to allow the thermal print head 71 to enter into the interior of the cassette case 51. On the other hand, the cassette case 51 is also formed with another opening 60 opposite to the opening 59 which is so sized to allow the platen roller 72 to enter into the interior of the cassette case 51.

Figure 3:
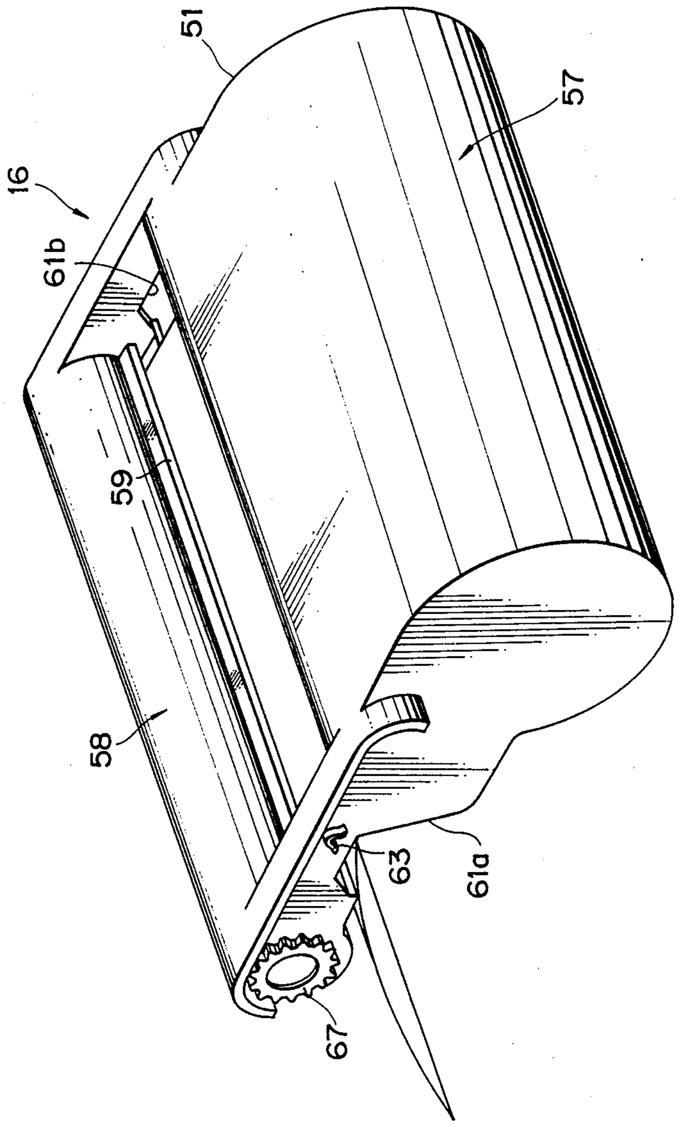
FIG. 3 is a schematic, perspective view showing an ink sheet/recording paper cassette which may be detachably mounted in position in the facsimile machine of FIG. 1.

As shown in FIG. 3, a pair of cut-away portions 61*a*, 61*a* is formed on both sides of the cassette case 51 corresponding in position to the pair of opposite openings 59 and 60 so as to avoid interference with the platen roller 72. In addition, a pair of pin receiving members 63 (only one of which is illustrated in FIG. 3) is formed on opposite side surfaces of the cassette case 51 and these pin receiving members 63 come into engagement with pins (not shown) provided in the recording unit 17 when the ink sheet cassette 16 is set in position in the recording unit 17 to thereby keep the ink sheet cassette 16 in position.

Returning again to FIG. 1, the cassette case 51 is also formed with a further opening 62 at its bottom and in the vicinity of the opening 60, and this opening 62 is located corresponding in position to a later-described end detecting sensor 76. Thus, the end detecting sensor 76 may detect an end mark provided at the end of the recording paper 54 through the opening 62. The ink sheet 52, for example, includes a base sheet of polyester and a thermally transferrable ink layer formed on the base sheet. Preferably, the ink sheet 52 is somewhat wider than the recording paper 54 and initially wound around a supply spool 52*a*. The total length of the ink sheet 52 is set to be longer than that of the recording paper 54. In addition, the leading end of the ink sheet 52 is fixedly attached to the take-up spool 53 and thus the ink sheet 52 is unwound from the supply spool 52*a* and wound around the take-up spool 53 after travelling around the guide rollers 55 and 56. As the recording paper 54, use is made of plain paper and it is initially in the form of a roll and a predetermined end mark is provided near the end of the recording paper 54. Such an end mark is located on the recording paper 54 such that it may be aligned with the end detecting opening 62 formed in the cassette case 51. The guide rollers 55 and 56 are formed, for example, from a metal and they extend across the width of the cassette case 51 to thereby effectively define a travelling path for the ink sheet 52 and also for the recording paper 54.

Figure 4A:
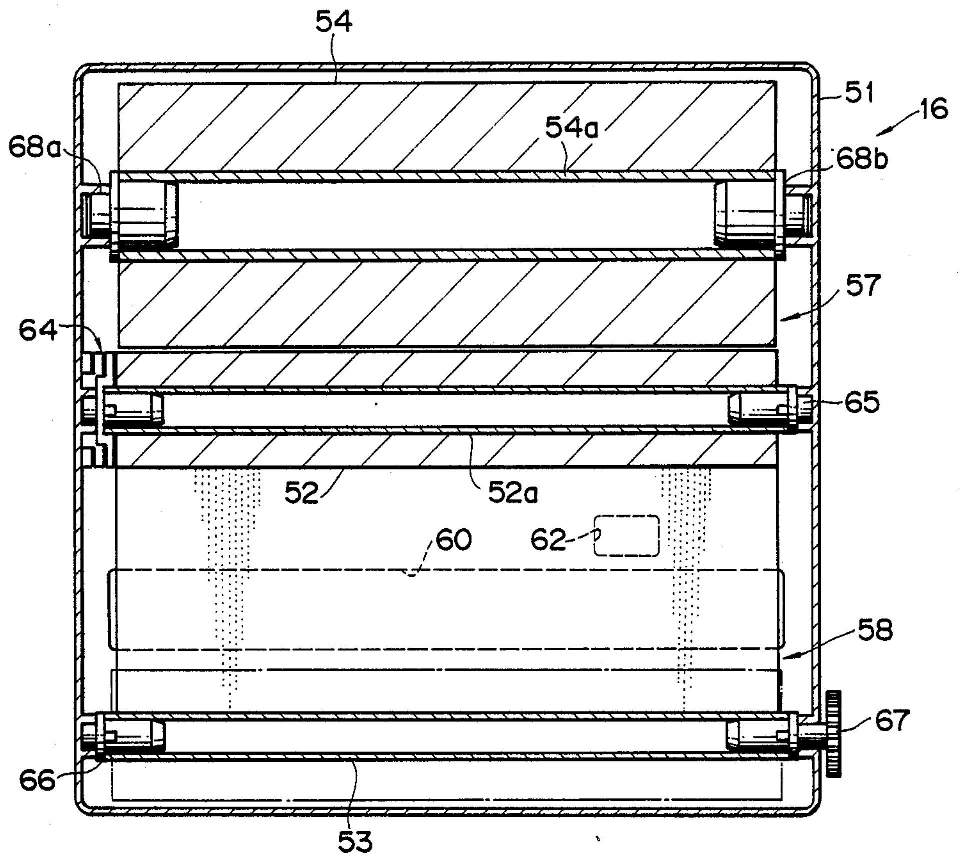
FIG. 4*a* is a schematic, plan view of the ink sheet/-recording paper cassette shown in FIG. 3.

In the present embodiment, the roll of ink sheet 52, the take-up spool 53 and the roll of recording paper 54 are disposed inside of the cassette case 51 in the arrangement shown in FIG. 4*a*. That is, a back tension mechanism 64 is mounted at one end of the supply spool 52*a* for winding the ink sheet 52 after use, and the back tension mechanism 64 applies a predetermined load to the ink sheet 52 when it is wound around the take-up spool 53. Thus, the back tension mechanism 64 applies a predetermined tension to the ink sheet 52 to thereby prevent creases from being formed in the ink sheet 52 unwound from the supply roll. A support member 65 is mounted at the opposite end of the supply spool 52*a*. A support member 66 is mounted at one end of the take-up spool 53 and a take-up gear 67 is mounted at the opposite end of the take-up spool 53. The take-up gear 67 serves to transmit an externally input driving force to the take-up spool 53. The roll of recording paper 54 is supported as wound around a supply spool 54*a*, both ends of which are provided with support members 68*a* and 68*b* for rotatably supporting the supply spool 54*a*. Thus, the roll of ink sheet 52, the take-up spool 53 and the roll of recording paper 54 are rotatably maintained in respective positions inside of the cassette case 51 by means of these back tension mechanism 64, support members 65 and 66, take-up gear 67 and support members 68*a* and 68*b*. The take-up gear 67 is located outside of the cassette case 51, and when the ink sheet cassette 16 is mounted in position in the recording unit 17, it comes into mesh with an idle gear 104 which constitutes one component of the driving system 77 of the recording unit 17.

In the above-described structure, the back tension mechanism 64 and the support member 65 define an ink sheet supporting means; whereas, the take-up spool 53, the support member 66 and the take-up gear 67 define a take-up means. In order to mount each of these elements, the cassette case 51 is divided into a plurality of segments at predetermined locations (not shown). And, if the ink sheet cassette 16 is intented to be of the disposable type, after assemblage, the segments are permanently affixed together, for example, by ultrasonic fusing. On the other hand, if the ink sheet cassette 16 is intended to be of the reusable type, the segments of the cassette case 51 are put together such that they may be disassembled and assembled as many times as desired.

Once again returning to FIG. 1, the recording unit 17 includes such elements as thermal print head 71, platen roller 72, cutter unit 73, paper discharge rollers 74 and 75, end detecting sensor 76 and driving system 77 (not shown in FIG. 1). The thermal print head 71 is provided with a plurality of heat-producing (resistor) elements arranged in the form of a single array as spaced apart from each other at a predetermined pitch as extending in the direction across the width of the recording paper 54. The plurality of heat-producing elements of the thermal print head 71 are selectively activated to define a heat pattern in accordance with image information supplied from the control unit 15, whereby the heat pattern thus defined is applied to the ink sheet 52 which is sandwiched between the thermal print head 71 and the platen roller 72 so that the ink layer of the ink sheet 52 is selectively fused and thus caused to be transferred to the recording paper 54 in contact.

The thermal print head 71 is fixedly supported on a head bracket 78 which is fixedly attached to the bottom wall of the upper half section 11*a*. The head bracket 78 is provided with an urging mechanism (not shown) for applying an urging force to the thermal print head 71 when the heat-producing elements (not shown) of the thermal print head 71 are brought into pressure contact with the platen roller 72 so as to provide an increased contact force between the heat-producing elements of the thermal print head 71 and the platen roller 72. Thus, when the upper half section 11*a* is pivotted open around the lower support pivot 35, the thermal print head 71 is separated away from the platen roller 72 which is rotatably supported in the lower half section 11*b*; whereas, when the upper half section 11*a* is pivotted to its closed position around the lower support pivot 35, the thermal print head 71 comes into pressure contact with the platen roller 72. The platen roller 72 is driven to rotate by the driving system 77 and in normal operation it causes the recording paper 54 to be transported toward the cutter unit 73 upon completion of recording of each line by the thermal print head 71, i.e., carrying out auxiliary scanning. After severing of the recording paper 54 by the cutter unit 73, the platen roller 72 causes the recording paper 54 to move backward over a predetermined distance so as to minimize the leading margin of the recording paper 54 (e.g., about 2 mm) for the next cycle of recording operation. The cutter unit 73 is internally provided with a paper cutting mechanism and it cuts the recording paper 54 to a desired size. A cut sheet of recording paper which has been severed by the cutter unit 73 is then discharged onto a paper tray (not shown) as transported by paper discharge transport rollers 74 and 75.

The end detecting sensor 76 may, for example, be comprised of a photodetector which is disposed in the vicinity of the end mark detecting opening 62 formed in the cassette case 51 so as to optically detect the end mark which is provided on the recording paper 54 near the end thereof. The driving system 77 is provided for effecting winding of the ink sheet 52 around the take-up spool 53 and also for driving to rotate the platen roller 72, and it has a structure generally shown in FIGS. 5*a* and 6. It is to be noted that the driving system 77 is mounted on a frame 79 of the lower half section 11*b*.

Figure 5A:
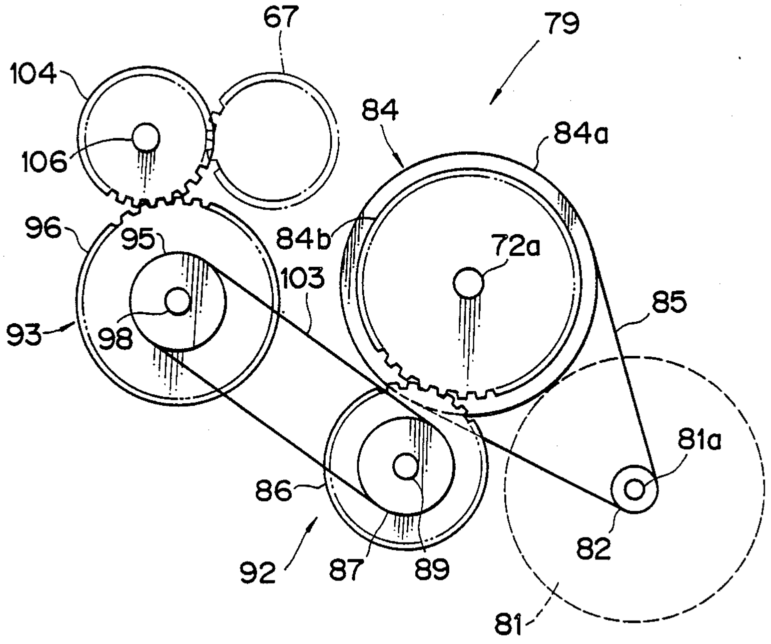
FIG. 5*a* is a schematic illustration showing a power transmitting system provided in the facsimile machine of FIG. 1.
Figure 6:
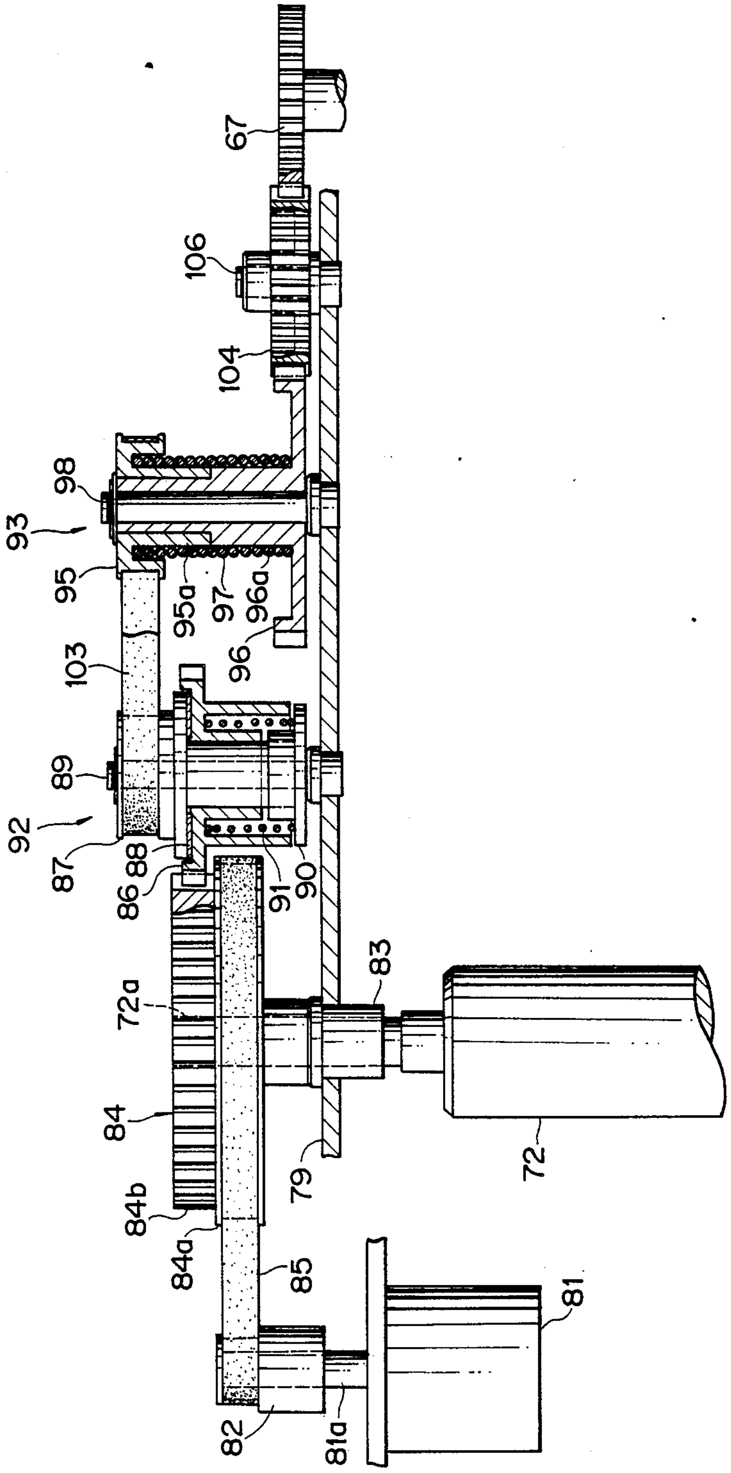
FIG. 6 is a schematic illustration showing partly in cross section the power transmitting system shown in FIG. 5a and provided in the facsimile machine of FIG. 1.

As shown in FIGS. 5*a* and 6, a stepping or pulse motor 81 is fixedly mounted on the frame 79 and a belt pulley 82 is fixedly attached to a drive shaft 81*a* of the motor 81. On the other hand, the platen roller 72 has a shaft 72*a* which is rotatably supported by the frame 79 through bushings 83 and a platen gear 84 is fixedly attached to one end of the shaft 72*a*. The platen gear 84 includes a belt pulley 84*a* and a gear 84*b*, which are integrally formed, and the belt pulley 84*a* is operatively coupled to the belt pulley 82 through a timing belt 85. The belt pulley 84*a* of the platen gear 84 is formed to be larger in diameter than the belt pulley 82. Thus, the rotation of the stepping motor 81 is transmitted to the platen roller 72 through the timing belt 85 and thus the platen roller 72 is driven to rotate at a predetermined reduction ratio. On the other hand, the gear 84*b* of the platen gear 84 is in mesh with a friction gear 86 which is coaxially provided with a friction pulley 87. A felt disc 88 is interposed between thrust surfaces of the friction gear 86 and the friction pulley 87, and the friction gear 86 and the friction pulley 87 may rotate relative to each other through this felt disc 88. The friction plate 87 is fitted onto a pin 89 which is fixedly attached to the frame 79 and it is prevented from slipping away by means of an E ring mounted at the end of the pin 89. In addition, a plate 90 is press-fitted into the friction pulley 87 so as to define a unit structure and rotatable around the pin 89. A spring 91 is provided under compression between the plate 90 and the friction gear 86 so that the spring 91 keeps the friction gear 86 pressed against the friction pulley 87. As a result, a rotational driving force is transmitted between the friction gear 86 and the friction pulley 87 through a frictional coupling through the felt disc 88 under pressure by means of the spring 91.

Thus, if the driving force applied to the friction gear 86 exceeds a predetermined load level, the felt disc 88 starts to cause slippage to thereby limit the level of the driving force to be transmitted between the friction gear 86 and the friction pulley 87. It should be appreciated that the friction gear 86, the friction pulley 87, the felt disc 88, the plate 90 and the spring 91 together define a friction mechanism 92.

On the other hand, on the frame 79 is also mounted a one-way clutch mechanism 93 which serves to take up the ink sheet 52 as wound around the take-up spool 53. The one-way clutch mechanism 93 includes a one-way pulley 95, a one-way gear 96 and a clutch spring 97, which are coaxially disposed as fitted onto a pin 98 which in turn is fixedly attached to the frame 79. An E ring is attached at the top of the pin 98 so as to prevent the elements fitted onto the pint 98 from undesirably slipping away. The one-way pulley 95 and the one-way gear 96 have shaft sections 95*a* and 96*a* identical in diameter, respectively, and they are rotatably supported. The clutch spring 97 is fitted onto the shaft sections 95*a* and 96*a*. With this structure, when the one-way pulley 95 rotates in the winding direction of the spring 97, the clutch spring 97 becomes tightly fitted onto both of the shaft sections 95*a* and 96*a* so that a driving force may be transmitted from the one-way pulley 95 to the one-way gear 96; on the other hand, when the one-way pulley 95 rotates in the direction opposite to the winding direction of the spring 97, the clutch spring 97 becomes loosened and thus slips on the shaft sections 95*a* and 96*a* so that the driving force of the one-way pulley 95 is not transmitted to the one-way gear 96. As a result, the one-way clutch mechanism 93 allows to transmit a driving force only in one rotating direction.

In the present embodiment, it is so structured that, when the one-way pulley 95 rotates clockwise, the one-way clutch mechanism 93 transmits a rotating force to the one-way gear 96 and, when the one-way pulley 95 rotates counterclockwise, the one-way clutch mechanism 93 slips and transmits no rotating force to the one-way gear 96. The one-way pulley 95 is operatively coupled to the friction pulley 87 through a belt 103, so that the one-way pulley 95 transmits or does not transmit a driving force to the one-way gear 96 depending on the direction of rotation of the friction pulley 87. On the other hand, the one-way gear 96 of the one-way clutch mechanism 93 is in mesh with an idle gear 104 which is rotatably supported as fitted onto a pin 106 which in turn is fixedly attached to the frame 79. When the ink sheet cassette 16 is mounted in position in the recording unit 17, the idle gear 104 becomes meshed with the take-up gear 67 of the ink sheet cassette 16. The idle gear 104 is provided such that the direction of rotation of the take-up gear 67 is identical to the direction of rotation of the one-way gear 96. Thus, during recording, the ink sheet 72 becomes wound around the take-up spool 53 in accordance with the auxiliary scanning of the recording paper due to the rotation of the platen roller 72 and the advancement toward the paper cutting position.

In operation, in the first place, the upper half section 11*a* of the present facsimile machine 11 is unlocked from the lower half section 11*b* and then the upper half section 11*a* is pivotted counterclockwise around the lower support pivot 35 in the direction indicated by the arrow F in FIG. 1, so that the upper half section 11*a* is pivotted counterclockwise to be separated away from the stationary lower half section 11*b* to thereby expose the recording unit 17 mounted in the lower half section 11*b*. In this case, the thermal print head 71 is also moved away from the platen roller 72. With the interior of the lower half section 11*b* exposed, an ink sheet cassette 16 is detachably mounted in position in the recording unit 17 from above. The mounting of this ink sheet cassette 16 is effected by having both of the pin receiving members 64 provided on both side surfaces of the cassette case 51 engaged with respective positioning pins (not shown) provided on the frame 79 of the lower half section 11*b*. With the ink sheet cassette 16 so set in position, the take-up gear 67 located outside of the cassette case 51 becomes meshed with the idle gear 104 of the driving system 77. Thus, a driving force from the driving system 77 may be transmitted to the take-up gear 67 so that the winding of the ink sheet 54 around the take-up spool 53 by means of the driving system 77 can be carried out. Under the condition, the platen roller 72 moves into the interior of the cassette case 51 through the opening 60 to be located therein to thereby hold both of the ink sheet 52 and the recording paper 54 from below.

Then, the upper half section 11*a* is pivotted clockwise to have it located at its closed position so that the thermal print head 71 moves downward and enters into the interior of the cassette case 51 through the opening 59 and is pressed against the platen roller 72. As a result, the ink sheet 52 and the recording paper 54 are sandwiched between and held under pressure between the thermal print head 71 and the platen roller 72. And, then, the upper half section 11*a* is locked to the lower half section 11*b* by means of a locking mechanism (not shown), thereby completing the mounting of the ink sheet cassette 16. Upon completion of mounting of the ink sheet cassette 16, a control signal is output from the control unit 15 to the driving system 77 so that the ink sheet 52 and the recording paper 54 are transported over a predetermined amount. Thus, any slack of the ink sheet 53 is removed and a predetermined back tension is applied to the ink sheet 52, and at the same time, the recording paper 54 is supplied into the cutter unit 73 to be cut to thereby define a predetermined leading portion as will be described further in detail later.

Upon receipt of image information through the external transmission line, the image information is demodulated at the MODEM 42 and the original image information is reconstructed by the data compression/reconstruction circuit 43 so that the thus reconstructed original image information is stored in the buffer memory 44. The image information stored in the buffer memory 44 is output to the recording unit 17, together with a control signal from the control circuit 46, and thus a corresponding image is recorded by the recording unit 17. This recording is effected by the repetitive, line-by-line optical scanning by the thermal print head 71 and the auxiliary scanning of the ink sheet 52 and the recording paper 54 by the driving system 77. That is, when image information and a control signal have been input into the control unit 17, the plurality of heat-producing elements of the thermal print head 71 are selectively activated to define a heat pattern which is then applied to the ink sheet 52 to have its ink layer molten selectively and then transferred to the recording paper 54 to effect recording of one line. In synchronism with this recording of one line of image information, the stepping motor 81 of the driving system 77 is driven to rotate counterclockwise, which then causes the platen gear 84 to rotate counterclockwise through the belt pulley 82 and the timing belt 85. As a result, the platen roller 73 to which the platen gear 84 is fixedly attached rotates to effect transportation (auxiliary scanning) of the recording paper 54. At the same time, when the friction gear 86 in mesh with the gear 84*b* of the platen gear 84 rotates clockwise, the rotation of the friction gear 86 is transmitted to the friction pulley 87 through the felt disc 88. The rotation thus transmitted to the friction pulley 87 is then transmitted to the one-way pulley 95 of the one-way clutch mechanism 93 through the timing belt 103. And, if the rotation is in the clockwise direction (i.e., forward transportation of the recording paper 54), the one-way clutch mechanism 93 is set in a clutched state so that the rotating force is transmitted to the take-up gear 67 of the ink sheet cassette 16 through the one-way gear 96 of the one-way clutch mechanism 93 and the idle gear 104. Accordingly, during recording, the ink sheet 52 may be wound around the take-up spool 53 over an amount corresponding to the amount of transportation of the recording paper 54 by the platen roller 72.

Initially, the roll of the ink sheet 52 which has been wound around the take-up spool 53 is relatively small in diameter and thus the amount or length of the ink sheet 52 which is wound around the take-up spool 53 by one revolution is relatively small; however, as the ink sheet 52 is more wound around the take-up spool 53, the roll of the ink sheet 52 which has been wound around the take-up spool 53 becomes larger in diameter and thus the amount of the ink sheet 52 which is wound around the take-up spool 53 by one revolution becomes larger, which may be many times larger than that at the outset. Under the circumstances, in order to keep the amount of the ink sheet 52 which is wound around the take-up spool 53 by one revolution at constant, provision is made of the friction mechanism 92. That is, since the diameter of the roll of the ink sheet 52 wound around the take-up spool 53 is smaller at the beginning, the torque for rotating the take-up spool 53 is also smaller. However, as the diameter of the roll of the ink sheet 52 wound around the take-up spool 53 becomes larger, the torque also becomes larger. In view of this, in accordance with the present embodiment, the amount of the ink sheet 52 which is taken up or wound around the take-up spool 53 at the time when the diameter of the roll of the ink sheet 52 wound around the take-up spool 53 is at minimum is set in accordance with the amount of transportation of the recording paper 54 by the platen roller 72 and an allowable load (torque) is also set for the friction mechanism 92. With this structure, even if the diameter of a roll of the ink sheet 52 wound around the take-up spool 53 becomes larger, the friction mechanism 92 provides slippage and prevents transmission of rotational force when the load (torque) exceeds its allowable limit. As a result, the ink sheet 52 is wound around the take-up spool 53 over a predetermined amount at all times irrespective of the size of the roll of ink sheet 52 wound around the take-up spool 53.

Upon completion of recording of one page of image information, the recording paper 54 is further transported by the platen roller 72 toward the cutter unit 73 and a predetermined length of the recording paper 54 is cut by the cutter unit 73. Thereafter, in accordance with a control signal from the control circuit 46, the stepping motor 81 is driven to rotate in the clockwise direction to thereby cause the platen roller 72 to rotate in the reversed direction. Thus, the leading edge of the recording paper 54 is moved back from the cutting position in the cutter unit 73 toward the thermal print head 71, thereby providing a leading margin of a predetermined length. In one example, this leading margin has a length in the order of 2 mm.

On the other hand, when the friction gear 86 rotates counterclockwise due to the reversed rotation of the platen roller 72, the rotation of the friction gear 86 is transmitted to the friction pulley 87 as described before and then to the one-way pulley 95 of the one-way clutch mechanism 93 through the timing belt 103. In this case, however, since the direction of rotation is counterclockwise, the one-way clutch mechanism 93 is set in its decoupled state so that winding of the ink sheet 52 is not carried out.

In this manner, in accordance with this embodiment, both of the ink sheet 52 and the recording paper 54, which are expendable supplies, are contained in a single case cassette and they are set in position in the recording unit 17 as contained in the same case cassette. Thus, replacement of these expendable supplies can be carried out easily and efficiently without causing creases in the ink sheet 52 or partly removing an ink layer from the ink sheet 52 by fingers or nails of an operator In addition, since both of the ink sheet 52 and the recording paper 54 are exchanged at the same time, an error between plain paper and thermosensitive paper can be eliminated. In addition, by setting the length of the ink sheet 52 while taking into consideration of the amount of the ink sheet 52 which is wound around the take-up spool 53 when the recording paper 54 is transported to the cutting position upon completion of recording, the amount of consumption of the ink sheet 52 may be made substantially identical to that of the recording paper 54, whereby the arrival of the end of each of the ink sheet 52 and the recording paper 54 can be detected by a single common end detecting sensor 76.

Figure 4B:
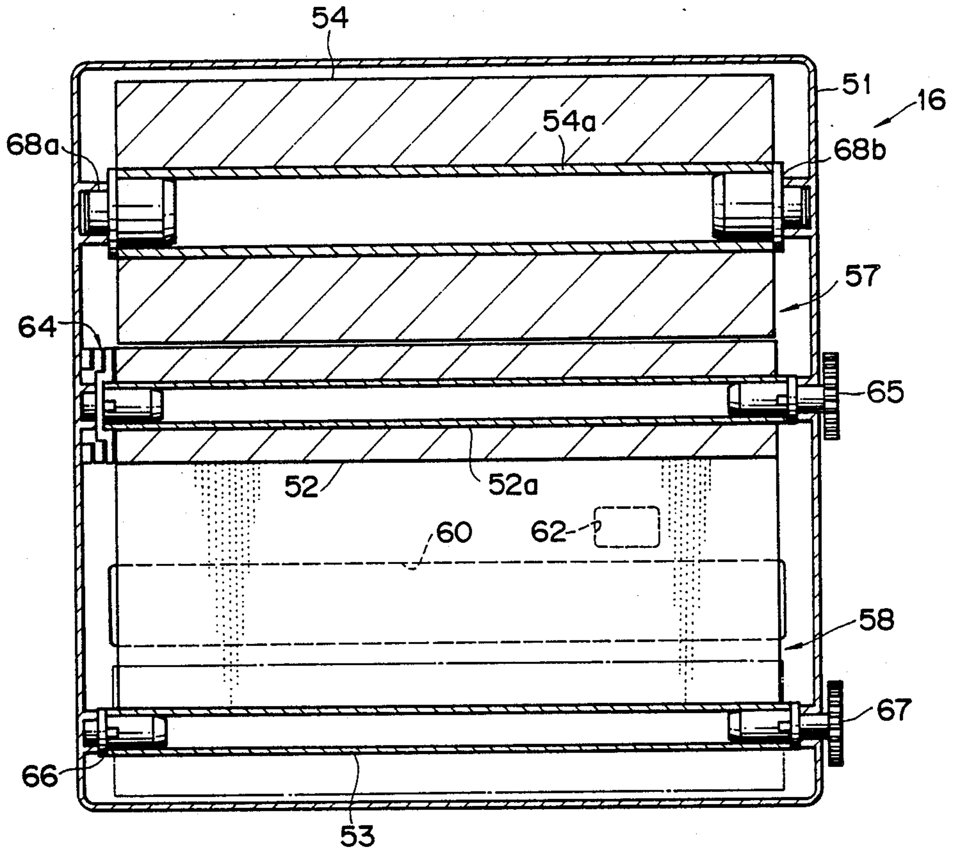
FIG. 4*b* is a schematic, plan view showing an ink sheet/recording paper cassette which is constructed in accordance with another embodiment of the present invention and which may be detachably mounted in position in the facsimile machine of FIG. 1.

Now, another embodiment of the present invention will be described with particular reference to FIGS. **4*b*, 5*b* and 6. It is to be noted that this embodiment is similar in many respects to the previously described embodiment excepting those shown in FIGS. 4*b* and 5*b*. That is, in accordance with this embodiment, the roll of ink sheet 52, the take-up spool 53 and the roll of recording paper 54 are arranged within the cassette case 51 as shown in FIG. 4*b*. The structure shown in FIG. 4*b* differs from the structure shown in FIG. 4*a* only in the provision of a return gear 65 at the end of the supply spool 52*a*, which is opposite to the end where the back tension mechanism 64 is provided. The return gear 65 is fixedly attached to the supply spool 52*a* so as to transmit a driving force applied from the exterior to the ink sheet 52**.

As shown in FIG. **4*b*, both of the return gear 65 and the take-up gear 67 are located outside of the cassette case 51. When the ink sheet cassette 16 is set in position in the recording unit 17, the return and take-up gears 65 and 67 come into mesh with idle gears 104 and 105 of the driving system 77 of the recording unit 17, respectively. In this embodiment, the back tension mechanism 64 and the return gear 65 as a whole define an ink sheet supporting means and on the other hand the take-up spool, support member 66 and take-up gear 67** as a whole define a take-up means.

Figure 5B:
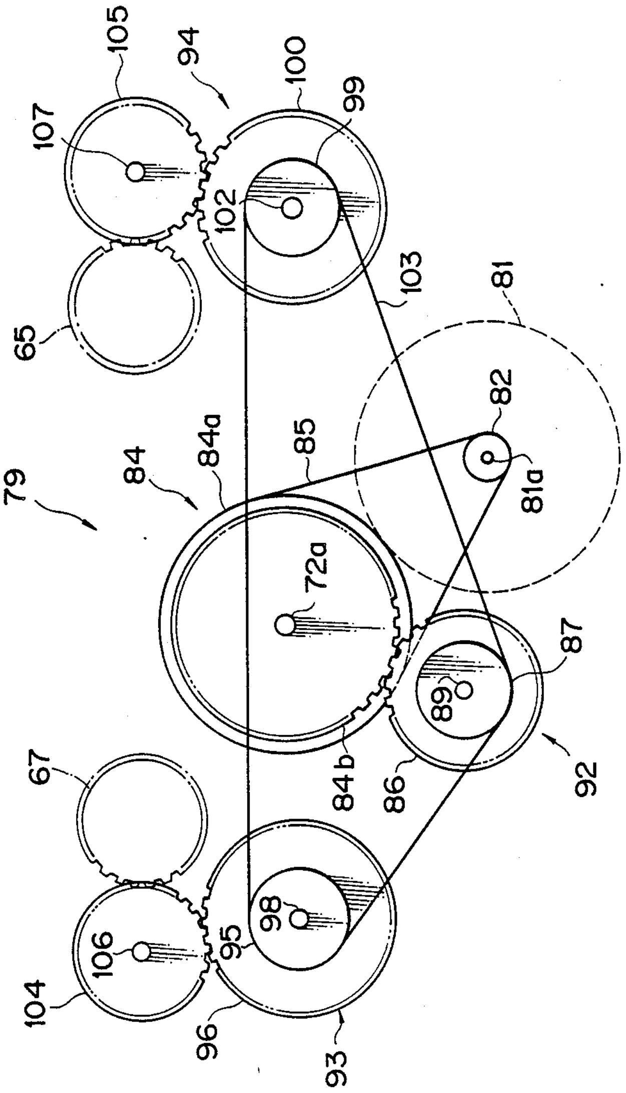
FIG. 5*b* is a schematic illustration showing a power transmitting system constructed in accordance with another embodiment of the present invention and applicable to the facsimile machine of FIG. 1.

The driving system 77 of the present embodiment is illustrated in FIG. **5*b* and it is similar in many respects to the driving system 77 of the previously described embodiment. As shown in FIG. 5*b*, the driving system 77 of the present embodiment additionally includes another one-way clutch mechanism 94 having a function of returning or rewinding the ink sheet 52. The additional one-way clutch mechanism 94 is also mounted on the frame 79 and is identical in structure to the one-way clutch mechanism 93 which has a function of winding the ink sheet 52 around the take-up spool 53**, as described before.

In the present embodiment, when the one-way pulley 95 rotates clockwise, the one-way clutch mechanism 93 transmits a rotating force to the one-way gear 96; on the other hand, when the one-way pulley 95 rotates counterclockwise, the one-way clutch mechanism 93 allows slippage. When the one-way pulley 99 rotates clockwise, the one-way clutch mechanism 94 allows slippage; on the other hand, when the one-way pulley 99 rotates counterclockwise, the one-way clutch mechanism 94 transmits a rotating force to the one-way gear 100. The one-way pulley 95 and the one-way pulley 99 are operatively coupled to the friction pulley 87 through the timing belt 103, and the one-way pulley 95 and the one-way pulley 99 transmit or do not transmit a driving force depending on the direction of rotation of the friction pulley 87.

On the other hand, the idle gear 104 is in mesh with the one-way gear 96 of the one-way clutch mechanism 93 and the idle gear 105 is in mesh with the one-way gear 100 of the one-way clutch mechanism 94. These idle gears 104 and 105 are rotatably supported as fitted onto the respective pins 106 and 107 fixedly attached to the frame 79. When the ink sheet cassette 16 is set in position in the recording unit 17, the idle gear 104 comes into mesh with the take-up gear 67 of the ink sheet cassette 16 with the idle gear 105 meshed with the return gear 65. The idle gears 104 and 105 are provided so as to make the direction of rotation of the take-up gear 67 and the return gear 65 to be identical to the direction of rotation of the one-way gear 95 and the one-way gear 99. Thus, during recording, in accordance with the auxiliary scanning of the recording paper 54 due to the rotation of the platen roller 72 and transportation of the recording paper 54 to the cutting position, the ink sheet 52 is wound or advanced in the forward direction; on the other hand, when the recording paper 54 is moved backward due to the reversed rotation of the platen roller 72, the ink sheet 52 is also moved backward over a predetermined amount. It is to be noted that in FIG. 6 the one-way clutch mechanism 94, the idle gear 105 and the return gear 65 are omitted.

In operation, the manner of detachably mounting an ink sheet cassette 16 in position in the recording unit 1 is carried out in the same manner as described above with reference to the previous embodiment. Upon completion of mounting of the ink sheet cassette 16 in position in the recording unit 17, the return and take-up gears 65 and 67 located outside of the cassette case 51 are brought into mesh with the idle gears 104 and 105 of the driving system 77, respectively. Thus, a driving force or power may be transmitted from the driving system 77 to the return gear 65 or to the take-up gear 67 to thereby carry out winding of or rewinding of the ink sheet 52 by the driving system 77. The remaining operation of the present embodiment is carried out basically in the same manner as that of the previously described embodiment excepting the following description regarding a particular aspect of the operation of the present embodiment.

During recording, the ink sheet 52 is wound around the take-up spool 53 over an amount corresponding to the amount of transportation of the recording paper 54 by the platen roller 72. In this case, the one-way clutch mechanism 94 remains in a decoupled state so that no driving force is transmitted to the ink sheet 52. Thus, during winding, only a back tension is applied to the ink sheet 52 by the back tension mechanism 64 which is mounted at one end of the supply spool 52*a*.

Upon completion of recording of one page of image information, the recording paper 54 is transported toward the cutter unit 73 by the platen roller 72 and cut to a desired size. Thereafter, in response to a control signal from the control circuit 46, the stepping motor 81 is driven to rotate clockwise to cause the platen roller 72 to rotate in the reversed direction. As a result, the leading edge of the recording paper 54 is pulled back from the cutting position in the cutter unit 73 toward the thermal print head 71 along its transportation path to thereby define a leading margin of the recording paper 54 for the next cycle of recording operation. This leading margin is set, for example, in the order of 2 mm. Because of the reversed rotation of the platen roller 72, the friction gear 86 rotates counterclockwise so that the rotation of the friction gear 86 is transmitted to the friction pulley 87 and to the one-way pulleys 95 and 99 of the one-way clutch mechanisms 93 and 94, respectively, through the timing belt 103. In this case, since the direction of rotation is counterclockwise, the one-way clutch mechanism 94 is set in a coupled state and thus the driving force is transmitted to the return gear 65 of the ink sheet cassette 16 through the one-way gear 100 of the one-way clutch mechanism 94 and the idle gear 105, so that the supply spool 52*a* is driven to rotate counterclockwise. Under this condition, the ink sheet 52 is rewound or moved backward over an amount corresponding to the amount of backward movement of the recording paper 54 by the platen roller 72. In this case, since the one-way clutch mechanism 93 is set in a decoupled state, the take-up spool 53 is unconstrained and applies an appropriate tension to the ink sheet 52 being rewound so as to prevent the occurrence of creases or slack.

As described above, in accordance with this second embodiment of the present invention, both of the ink sheet 52 and the recording paper 54, which are expendable supplies, are contained in a single cassette case and the provision is made of a first transmitting means for transmitting only the normal rotation of the platen roller 72 to the take-up gear 64 and a second transmitting means for transmitting only the reversed rotation of the platen roller 72 to the return gear 65. Thus, while the recording paper 54 moves forward by the normal rotation of the platen roller 72, the ink sheet 52 is wound around the take-up spool 53. On the other hand, after cutting of a predetermined length of the recording paper 54 by the cutter unit 73, when the platen roller 72 is driven to rotate in the reversed direction to move the recording paper 54 in the backward direction, the ink sheet 52 is also moved backward or rewound by an amount corresponding to the amount of backward movement of the recording paper 54. In this manner, the amount of consumption is maintained identical for the ink sheet 52 and for the recording paper 54. This allows to use a single common end detecting sensor 76 for detecting the end of each of the ink sheet 52 and the recording paper 54.

In the above-described embodiment, the stepping motor 81 is used as a common driving source for rotation of the platen roller 72 and winding and rewinding of the ink sheet 52. As an alternative structure, the provision may be made of an individual stepping motor for each of rotation of the platen roller 72 and winding and rewinding of the ink sheet 52. In this case, however, the two stepping motors must be synchronized in operation.

Figure 7:
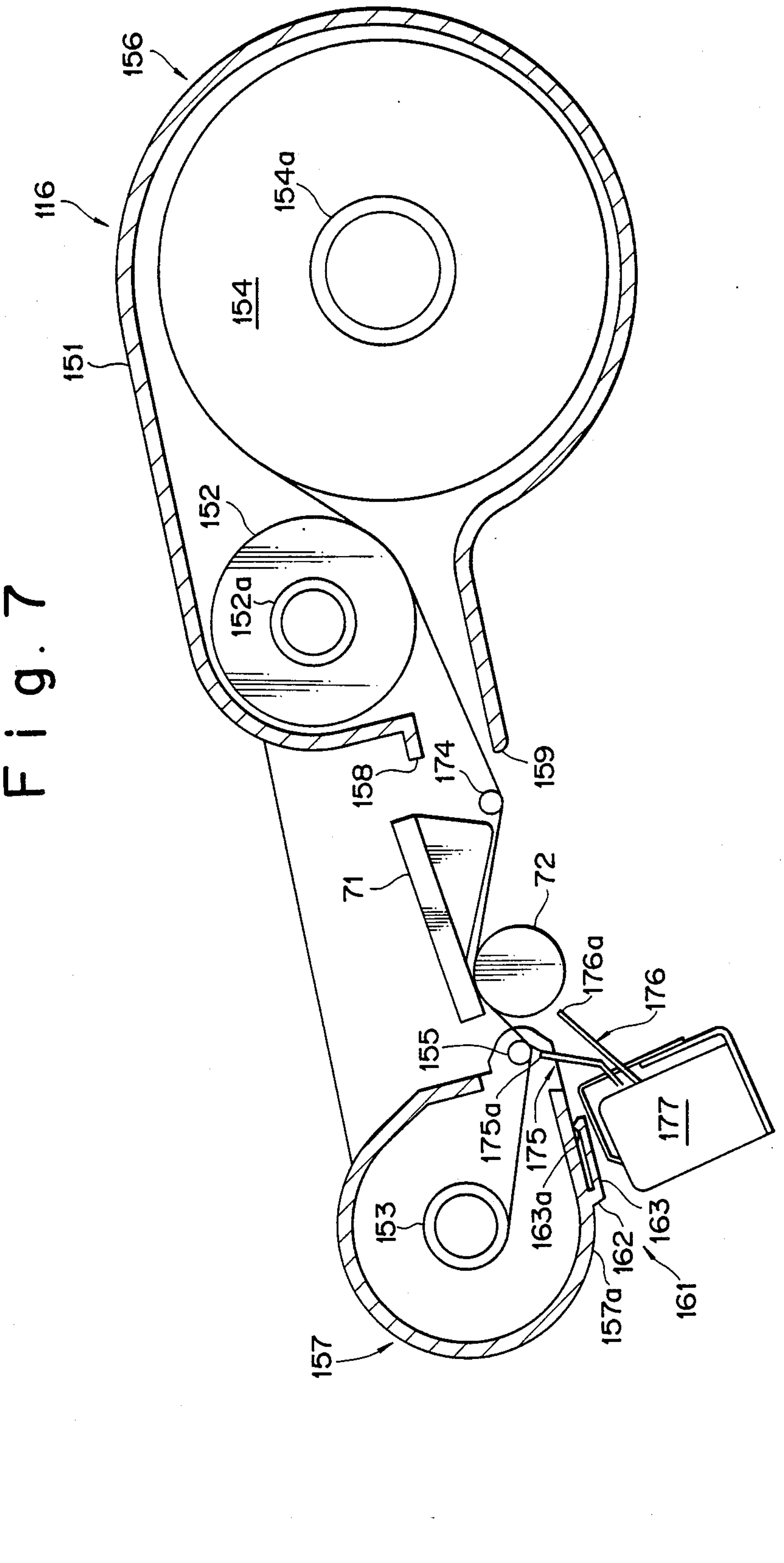
FIG. 7 is a schematic illustration showing an ink sheet/recording paper cassette constructed in accordance with a further embodiment of the present invention and showing the condition when detachably mounted in position in the facsimile machine of FIG. 1.
Figure 8:
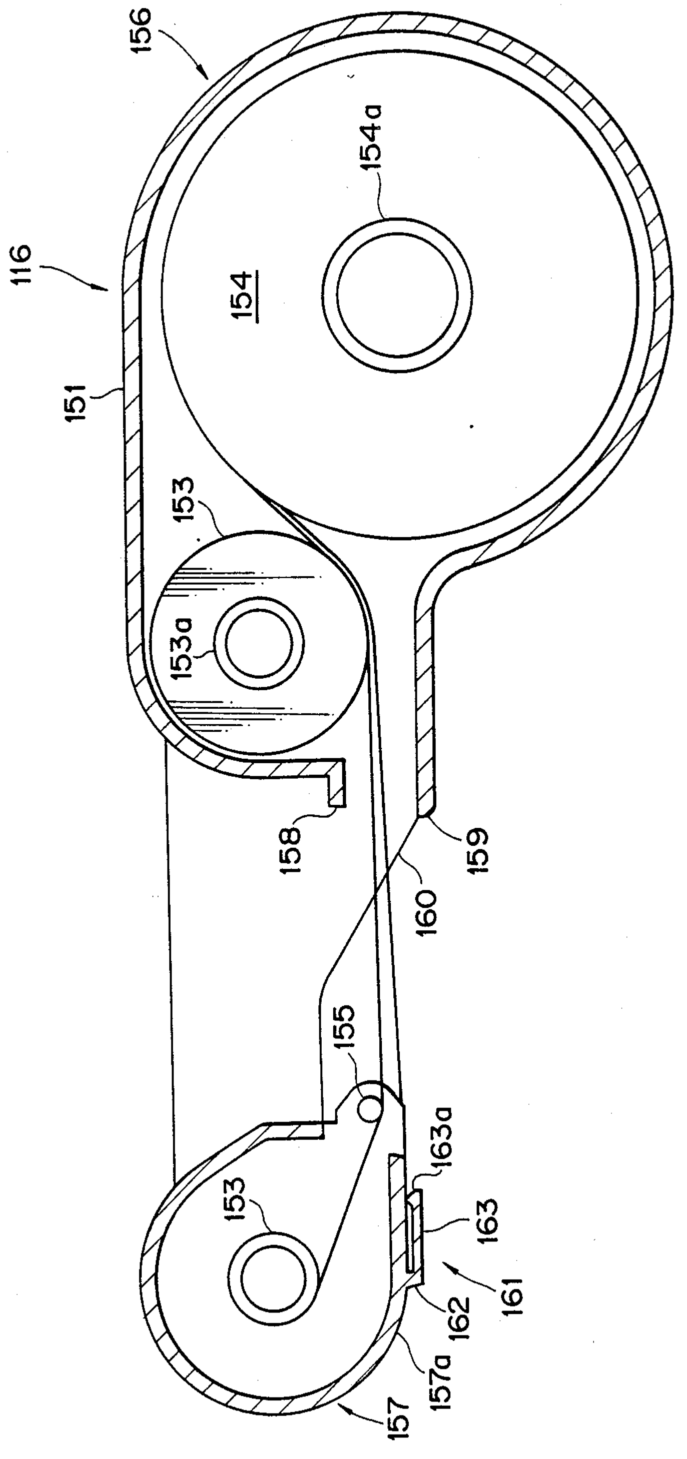
FIG. 8 is a schematic illustration showing the ink sheet/recording paper cassette of FIG. 7 when detached from the facsimile machine of FIG. 1.

A further embodiment of the present invention will now be described with particular reference to FIGS. 7 through 17. As shown in FIGS. 7 and 8, an ink sheet cassette 16 constructed in accordance with a further embodiment of the present invention includes a cassette case 151 which houses therein a roll of ink sheet 152, a take-up spool 153, a roll of recording paper 154 and a guide roller 155. The cassette case 151 is formed, for example, from an ABS resin material and it is generally divided into a supply region 156 which stores therein a supply roll of ink sheet 152 and a supply roll of recording paper 154 and a take-up region 157 in which the take-up spool 153 and the guide roller 155 are provided.

Figure 9:
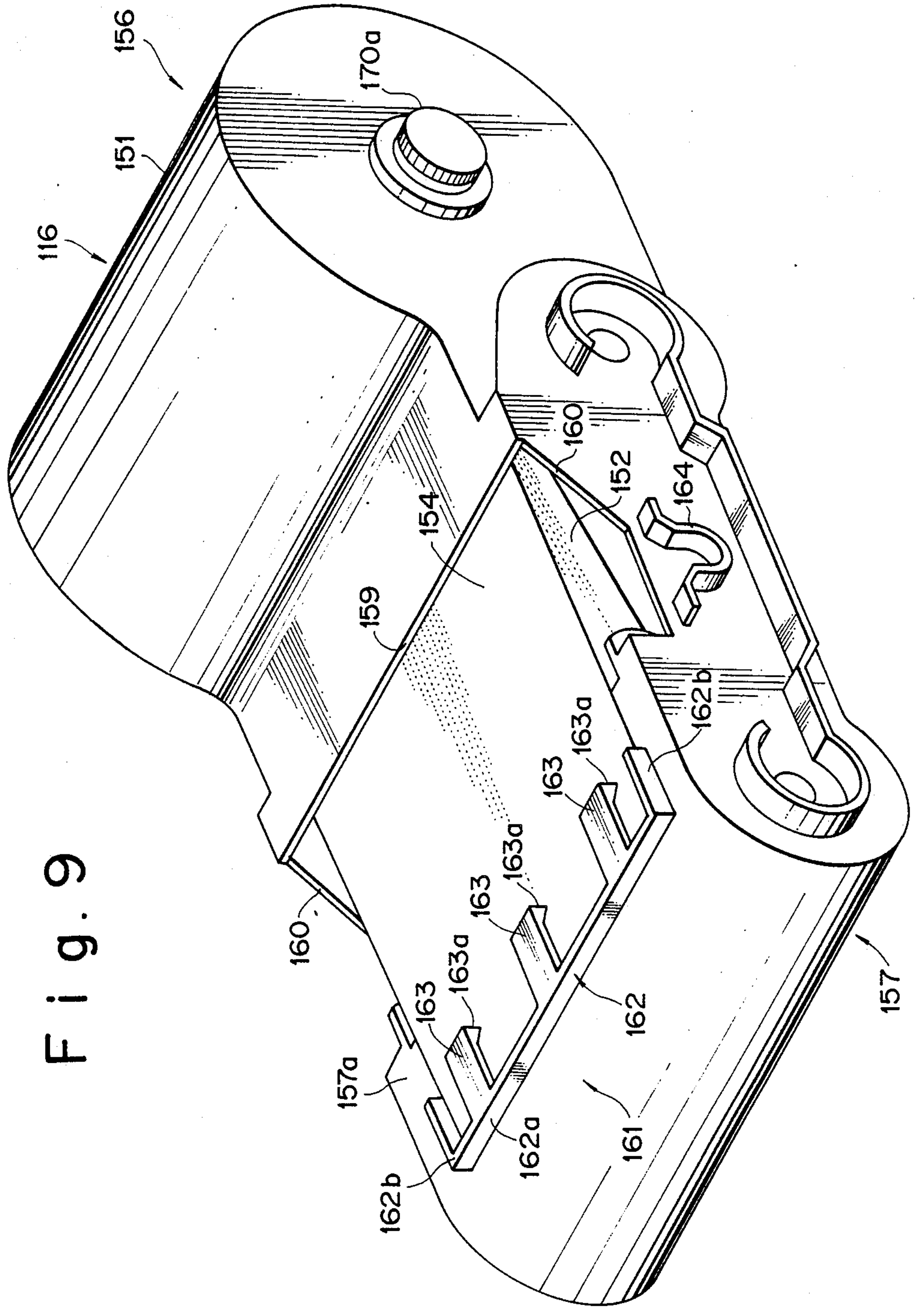
FIG. 9 is a schematic, perspective view showing the overall outside look of the ink sheet/recording paper cassette of FIG. 8.

The cassette case 151 is formed with a top opening 158 located between the supply and take-up regions 156 and 157, through which the thermal print head 71 and a guide roller 174 mounted in the upper half section 11*a* may enter into the interior of the cassette case 51. On the other hand, the cassette case 151 is also formed with a bottom opening 159 generally opposite to the top opening 158, through which the platen roller 172 mounted in the lower half section 11*b* may enter into the interior of the cassette case 151. As shown in FIG. 9, corresponding in position to these top and bottom openings 158 and 159, a pair of cut-away portions 160 is formed in the side walls of the cassette case 151 so as to allow to avoid interference between the cassette case 151 and the platen roller 172.

The take-up region 157 includes a bottom wall 157*a* which is provided with a recording paper holding unit 161 comprised of a stopper member 162 and a holding member 163. As shown in FIG. 9, the stopper member 162 includes a stopper end wall 162*a* having a length identical to the width of the recording paper 54 and extending in the transverse direction with respect to the direction of transportation of the recording paper 54 and a pair of stopper side walls 162*b* which extend in parallel with the transporting direction of the recording paper 54 and engage with the opposite sides of the recording paper 54. Both of the stopper end and side walls 162*a* and 162*b* are preferably integrally formed with the cassette case 151. A plurality (three in the illustrated embodiment, though it may be any desired number, including one) of holding members 163 are integrally formed with the stopper end wall 162*a* as spaced apart from one another along the stopper end wall 162*a*, each extending from the top end of the stopper end wall 162*a* in the direction of transportation of the recording paper 54. Each of the holding members 163 is formed with a projection 163*a* at its tip end and extending across its width. The projection 163*a* of each of the holding members 163 is in contact with the bottom surface of the take-up region 157 of the cassette case 151.

With this structure, the holding members 163 hold the leading portion of the recording paper 54 under pressure when it has been inserted in the space between the bottom wall of the take-up region 157 of the cassette case 151 and the holding member 163 by means of the projections 163*a* and the elastic nature of the holding member 163. The cassette case 151 is formed with a pair of pin receiving members 164, one on each of its opposite side walls. Thus, when the ink sheet cassette 116 is mounted in position in the recording unit 117, the pin receiving members 164 come into engagement with pins (not shown) provided in the recording unit 17 so as to set the ink sheet cassette 116 securely in position.

Returning to FIGS. 7 and 8, the ink sheet 152 may be comprised of a polyester base sheet and a thermally transferrable ink layer formed on the base sheet, and the ink sheet 152 is preferably wider than the recording paper 154 used. Initially, a supply of ink sheet 152 is wound around a supply spool 152*a*. The total length of the ink sheet 152 is preferably set to be somewhat larger than the total length of the recording paper 154. The leading end of the ink sheet 152 is fixedly attached to the take-up spool 153 and the ink sheet 152 is wound around the take-up spool 153 after moving around the guide roller 155. Use is made of plain paper as the recording paper 154 and a predetermined end mark is provided near the end of the recording paper 154. The guide roller 155 is formed, for example, from a metal and it extends across the width of the cassette case 151. The guide roller 155 is provided in the ink sheet cassette 115 such that it becomes located immediately downstream of a contact (recording position) between the thermal print head 71 and the platen roller 72 with respect to the direction of advancement of the recording paper 54 when the ink sheet cassette 116 has been mounted in position in the recording unit 17. The guide roller 155 secures a transportation path for the ink sheet 152 and the recording paper 154 and has a function of separating the ink sheet 152 from the recording paper 154 which are in intimate contact after recording.

Figure 10:
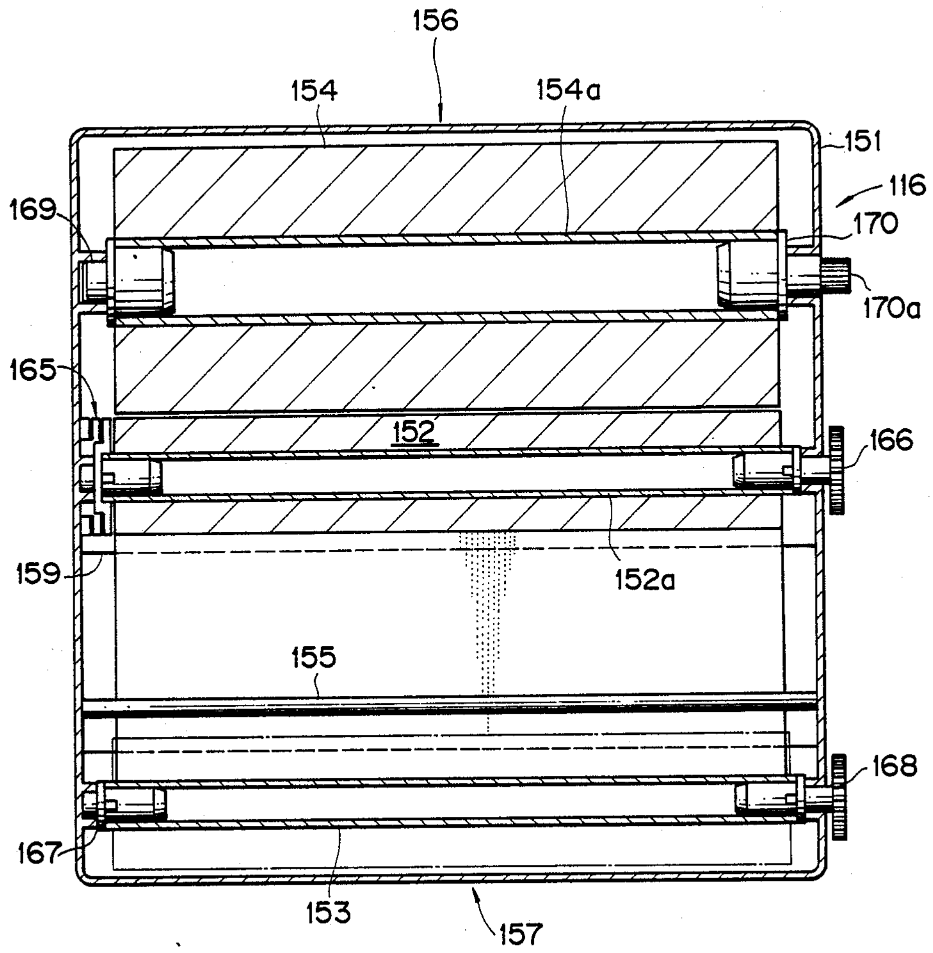
FIG. 10 is a schematic, plan view of the ink sheet/-recording paper cassette of FIG. 8.

Now, the roll of ink sheet 152, the take-up spool 153, the roll of recording paper 154 and the guide roller 155 are disposed within the space of the cassette case 151 in a manner as shown in FIG. 10. That is, the supply spool 152*a* for carrying thereon a roll of ink sheet 152 has one end provided with a back tension mechanism 165 which applies a predetermined load to the ink sheet 152 when it is wound around the take-up spool 153. The back tension mechanism 165 serves to apply an appropriate back tension to the ink sheet 152 to thereby prevent the occurrence of creases. The other end of the supply spool 152*a* is provided with a return or rewind gear 166. One end of the take-up spool 153 is provided with a support member 167 and the other end thereof is provided with a take-up gear 168, which is similar in structure to the return gear 166. The recording paper 154 is initially wound around a supply spool 154*a* whose opposite ends are provided with support members 169 and 170. The support member 170 is formed with a knob 170*a*.

Thus, the roll of ink sheet 152, the take-up spool 153 and the roll of recording paper 154 are rotatably supported at respective positions inside of the cassette case 151 through such elements as the back tension mechanism 165, the return gear 166, the support member 167, the take-up gear 168 and the support members 169 and 170. The return and take-up gears 166 and 168 are located outside of the cassette case 151 and they are brought into mesh with the idle gears 1105 and 1106, respectively, of a later-described driving system 180 of the recording unit 17 when the ink sheet cassette 116 has been set in position in the recording unit 117. The knob 170*a* formed in the support member 170 also projects outside of the cassette case 151, thereby allowing to grab the knob 170*a* to cause the supply spool 154*a* to turn manually. The back tension mechanism 165 and the return gear 166 as a whole define an ink sheet supporting means, and the return gear 166 and the take-up gear 168 define respective transmitting means. Both ends of the guide roller 155 are fixedly attached to the side walls of the cassette case 151; however, if desired, the guide roller 151 may also be so provided to be rotatable around its longitudinal axis by using bearings, bushes or the like.

Referring back to FIGS. 1 and 7, the recording unit 17 of the present embodiment includes such elements as thermal print head 71, platen roller 72, head bracket 73, guide roller 174, guide plates 175, 176, cutter unit 177, paper discharge rollers 178 and 179 and driving system 180. As described previously, the thermal print head 71 is provided with a plurality of heat-producing elements (not shown) arranged in the form of a single array extending in the widthwise direction of the recording paper 154. The plurality of heat-producing elements are selectively activated in accordance with image information supplied from the control unit 15 to define a heat pattern which is applied to the ink sheet 152 in contact with the recording paper 154 so that the thermally transferrable ink of the ink sheet 152 is transferred to the recording paper 154 according to the heat pattern. The thermal print head 71 is fixedly mounted on the head bracket 73 which in turn is fixedly attached to the bottom wall of the upper half section 11*a*. The head bracket 73 is also provided with an urging mechanism (not shown), so that when the thermal print head 71 is brought into contact with the platen roller 72, the urging mechanism urges the thermal print head 71 against the platen roller 72 to provide an enhanced contact therebetween.

When the upper half section 11*a* is pivotted open as being pivotted counterclockwise around the lower support shaft 35 with respect to the lower half section 11*b*, the thermal print head 71 is separated away from the platen roller 72, and when the upper half section 11*a* is pivotted closed or pivotted clockwise around the lower support shaft 35, the thermal print head 71 is brought into pressure contact with the platen roller 72. The platen roller 72 is driven to rotate by the driving system 180 to thereby cause the recording paper 154 to be transported toward the cutter unit 177; whereas, after cutting of the recording paper 154 to a desired length by the cutter unit 177, the platen roller 72 is driven to rotate in the reversed direction to thereby cause the recording paper 154 to move backward over a predetermined distance.

The guide roller 174 is formed, for example, from a metal and it is rotatably supported at its both ends by the head bracket 73 to thereby define a transportation path for the ink sheet 152 and the recording paper 154. When the upper half section 11*a* is pivotted open, the guide roller 174 moves in unison, thereby facilitating the mounting of an ink sheet cassette 116. The guide plates 175 and 176 define a portion of a travelling path for the recording paper 154. The guide plate 175 has one end 175*a* located close to the guide roller 155 of the ink sheet cassette 116 with a predetermined gap therebetween and the guide plate 176 has one end 176*a* located close to the platen roller 72 with a predetermined gap therebetween. The opposite ends of the guide plates 175 and 176 are located at the entrance to the cutter unit 177. Thus, the guide plates 175 and 176 serve to guide the recording paper 154, which has been transported by the platen roller 72 and separated from the ink sheet 152 by the guide roller 155, into the cutter unit 177. The cutter unit 177 is internally provided with a paper cutting mechanism which cuts the recording paper 154 thus fed to a predetermined size. The thus cut sheet of recording paper 154 is then discharged onto a tray (not shown) by paper discharge rollers 74 and 75. It is so structured that the paper discharge rollers 74 and 75 are normally in contact under pressure; however, when a cut sheet of recording paper 154 has been transported for discharge, the upper paper discharge roller 74 moves upward over a predetermined amount.

Figure 11:
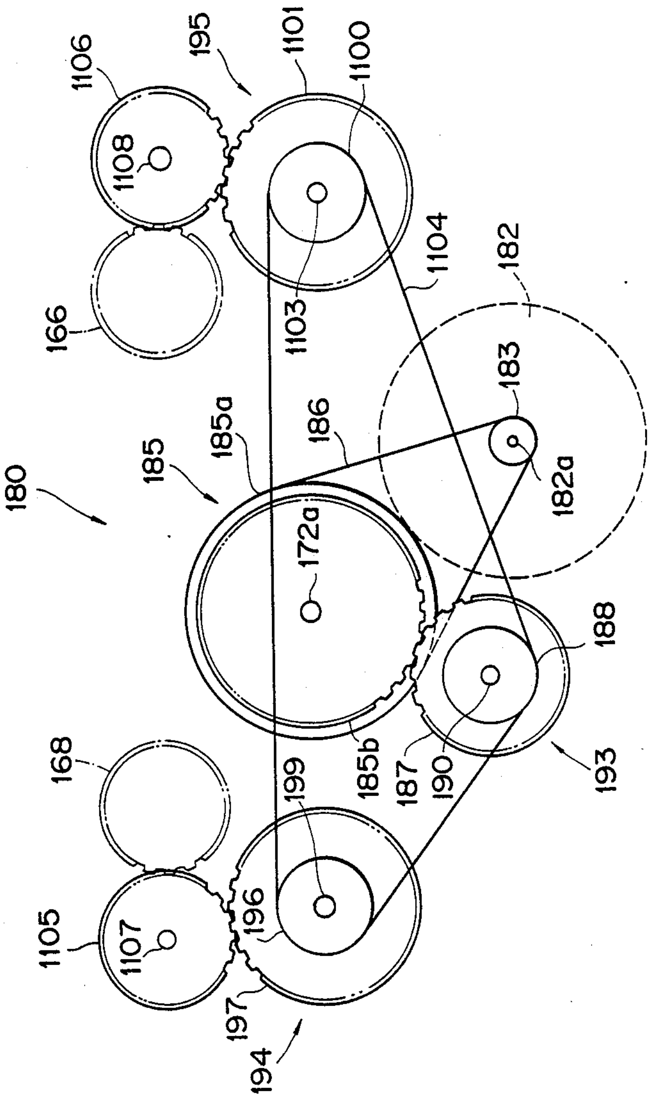
FIG. 11 is a schematic illustration showing the overall structure of a power transmitting system of a facsimile machine in which the ink sheet/recording paper cassette of FIG. 8 may be detachably mounted.
Figure 12:
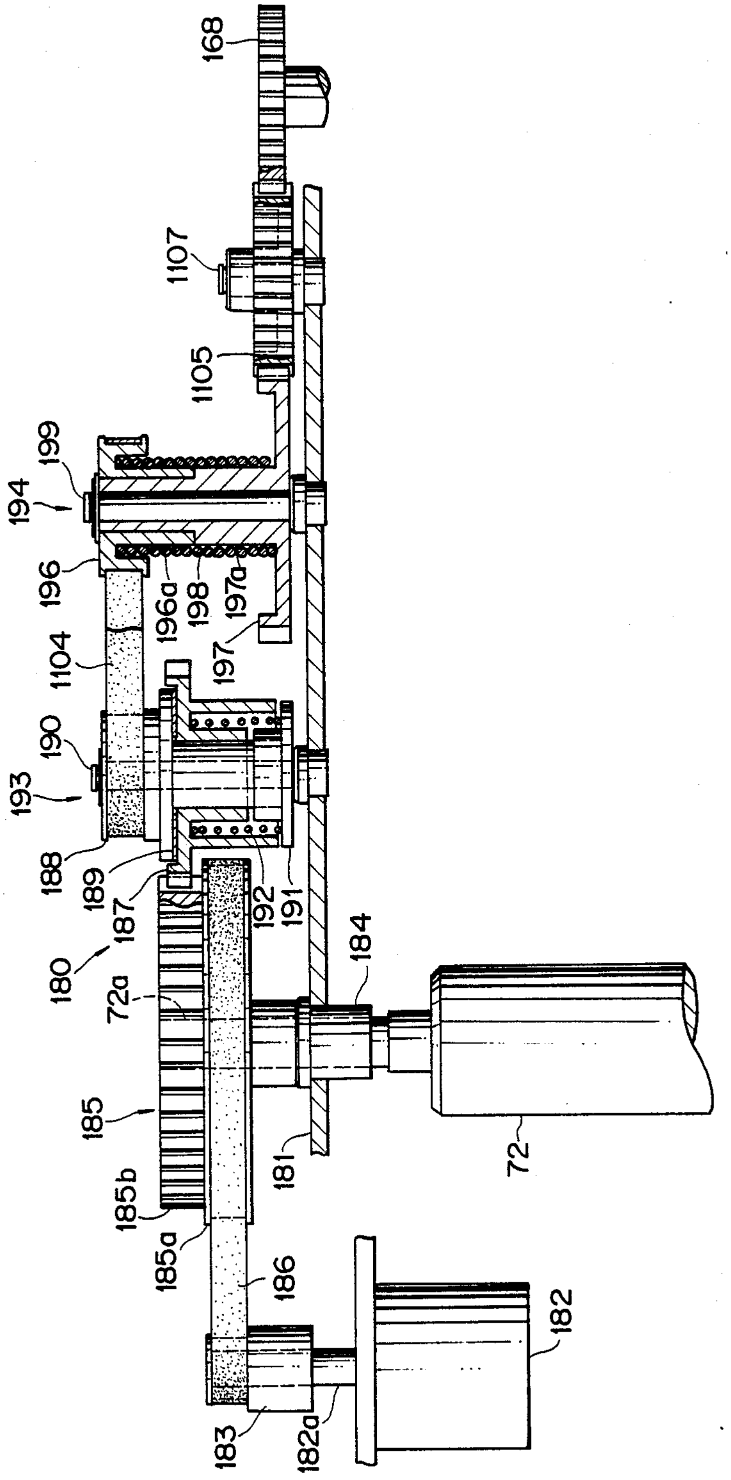
FIG. 12 is a schematic illustration showing partly in cross section the power transmitting system of FIG. 11.

The driving system 180 has a structure as shown in FIGS. 11 and 12 and it is mounted on a frame 181 of the lower half section 11*b*. As shown in FIGS. 11 and 12, a stepping or pulse motor 182 is fixedly attached to the frame 181 and a belt pulley 183 is fixedly attached to a motor shaft 182*a* of the stepping motor 182. On the other hand, the shaft 72*a* of the platen roller 72 is rotatably supported by means of bushes 184 and a platen gear 185 is fixedly attached to the shaft 72*a* at its one end. The platen gear 185 includes an integrally formed belt pulley 185*a* and a gear 185*b* and the belt pulley 185*a* is operatively coupled to the belt pulley 183 through a timing belt 186. The belt pulley 185*a* of the platen gear 185 is larger in diameter than the belt pulley 183. Thus, the rotation of the stepping motor 182 is transmitted to the platen roller 72 through the timing belt 186 so that the platen roller 72 is driven to rotate at a predetermined reduction ratio. On the other hand, the gear 185*b* of the platen gear 185 is in mesh with a friction gear 187 which is provided coaxially with a friction pulley 188. A felt disc 189 is interposed between the opposite thrust surfaces of the friction gear 187 and the friction pulley 188 and thus the friction gear 187 and the friction pulley 188 may rotate relative to each other through the felt disc 189. The friction pulley 188 is rotatably fitted onto a pin 190 which is fixedly attached to the frame 181 and an E ring is attached at the tip end of the pin 190 so as to prevent the friction pulley 188 from slipping away.

In addition, a plate 191 is also mounted on the pin 190 with a spring 192 interposed under pressure between the plate 191 and the friction gear 187, so that the friction gear 187 is urged against the friction pulley 188 by the recovery force of the spring 192. Thus, a driving force may be transmitted between the friction gear 187 and the friction pulley 188 through the felt disc 189 and the recovery force of the spring 192. With this structure, when the driving force applied to the friction gear 187 exceeds a predetermined level, the felt disc 189 starts to slip to thereby limit the level of the driving force to be transmitted. Accordingly, the friction gear 187, the friction pulley 188, the felt disc 189, the plate 191 and the spring 192 together define a friction mechanism 193.

On the frame 181 are also provided a one-way clutch mechanism 194 for winding of the ink sheet 152 and another one-way clutch mechanism 195 for rewinding of the ink sheet 152. The one-way clutch mechanism 194 includes a one-way pulley 196, a one-way gear 197 and a clutch spring 198, which are coaxially mounted on a pin 199 which is fixedly attached to the frame 181 with an E ring attached to the tip end of the pin 199 for preventing these elements from slipping away. Both of the one-way pulley 196 and the one-way gear 197 have respective shaft portions 196*a* and 197*a* identical in outer diameter. A clutch spring 198 is commonly fitted onto the shaft portions 196*a* and 197*a*. With this structure, when the one-way pulley 196 rotates in the winding direction of the spring 198, the spring 198 becomes tightly coupled to both of the shaft sections 196*a* and 197*a* to have them coupled so that the driving force is transmitted from the one-way pulley 196 to the one-way gear 197. On the other hand, when the one-way pulley 196 rotates in the direction opposite to the winding direction of the spring 198, the spring 198 becomes loosened on the shaft portions 196*a* and 197*a* to have them decoupled so that no driving force is transmitted from the one-way pulley 196 to the one-way gear 197. As a result, the one-way clutch mechanism 194 allows to transmit a driving force only in one rotating direction. The one-way clutch mechanism 195 is structurally identical to the one-way clutch mechanism 194.

In the present embodiment, when the one-way pulley 196 rotates clockwise, the one-way clutch mechanism 194 is set in a coupled state and thus transfers a driving force to the one-way gear 197; on the other hand, when the one-way pulley 196 rotates counterclockwise, the one-way clutch mechanism 194 is set in a decoupled state. The one-way clutch mechanism 195 is so structured that it is decoupled when the one-way pulley 1100 rotates clockwise and coupled to transfer a driving force to the one-way gear 1101 when the one-way pulley 110 rotates counterclockwise. The one-way pulley 196 and the one-way pulley 1100 are operatively coupled to the friction pulley 188 through a timing belt 1104, and the one-way pulleys 196 and 1100 transmit or do not transmit a driving force depending on the direction of rotation.

The one-way gear 197 of the one-way clutch mechanism 194 is in mesh with an idle gear 1105 and the one-way gear 1101 of the one-way mechanism 195 is in mesh with an idle gear 1106. The idle gears 1105 and 1106 are rotatably supported on pins 1107 and 1108, respectively, which are fixedly attached to the frame 181, and the idle gear 1105 is brought into mesh with the take-up gear 168 of the ink sheet cassette 116 when the ink sheet cassette 116 has been mounted in position in the recording unit 17 with the idle gear 1106 brought into mesh with the return gear 166. These idle gears 1105 and 1106 are provided so as to make the direction of rotation of the take-up gear 168 and the return gear 166 to be identical to that of the one-way gear 197 and the one-way gear 1101. Thus, during recording, in accordance with the auxiliary scanning of the recording paper 154 and transportation of the recording paper 154 toward the cutting position due to the rotation of the platen roller 72, the ink sheet 52 is moved in the winding direction; whereas, when the recording paper 154 is to be moved backward by the reversed rotation of the platen roller 72, the ink sheet 52 is also moved backward over a predetermined amount. It is to be noted that in FIG. 12 the one-way clutch mechanism 195 is omitted for the sake of brevity.

In operation, the upper half section 11*a* is pivotted open by having it pivotted around the lower support shaft 35 counterclockwise. Since the thermal print head 71 is mounted in the upper half section 11*a*, the thermal print head 71 is also moved away from the platen roller 72 which is mounted in the lower half section 11*b*. Thus, the recording unit 17 mounted in the lower half section 11*b* is exposed. An ink sheet cassette 116 is inserted into the recording unit 17 from above to set it in position. In this case, the pin receiving members 164 provided on the opposite surfaces of the ink sheet cassette 116 are brought into engagement with the corresponding positioning pins (not shown) planted in the frame 181 of the lower half section 11*b*. With the ink sheet cassette 116 set in position, the return gear 166 and the take-up gear 168 located outside of the cassette case 151 are brought into mesh with the idle gears 1105 and 1106 of the driving system 180, respectively. As a result, a driving force is transmitted from the driving system 181 to the return gear 166 and also to the take-up gear 168, thereby allowing to carry out winding or rewinding of the ink sheet 152. In addition, the platen roller 72 and the top end 175*a* of the guide plate 175 are located inside of the cassette case 151 via the bottom opening 159 to support the ink sheet 152 and the recording paper 154 at a predetermined location from below.

Figure 13:
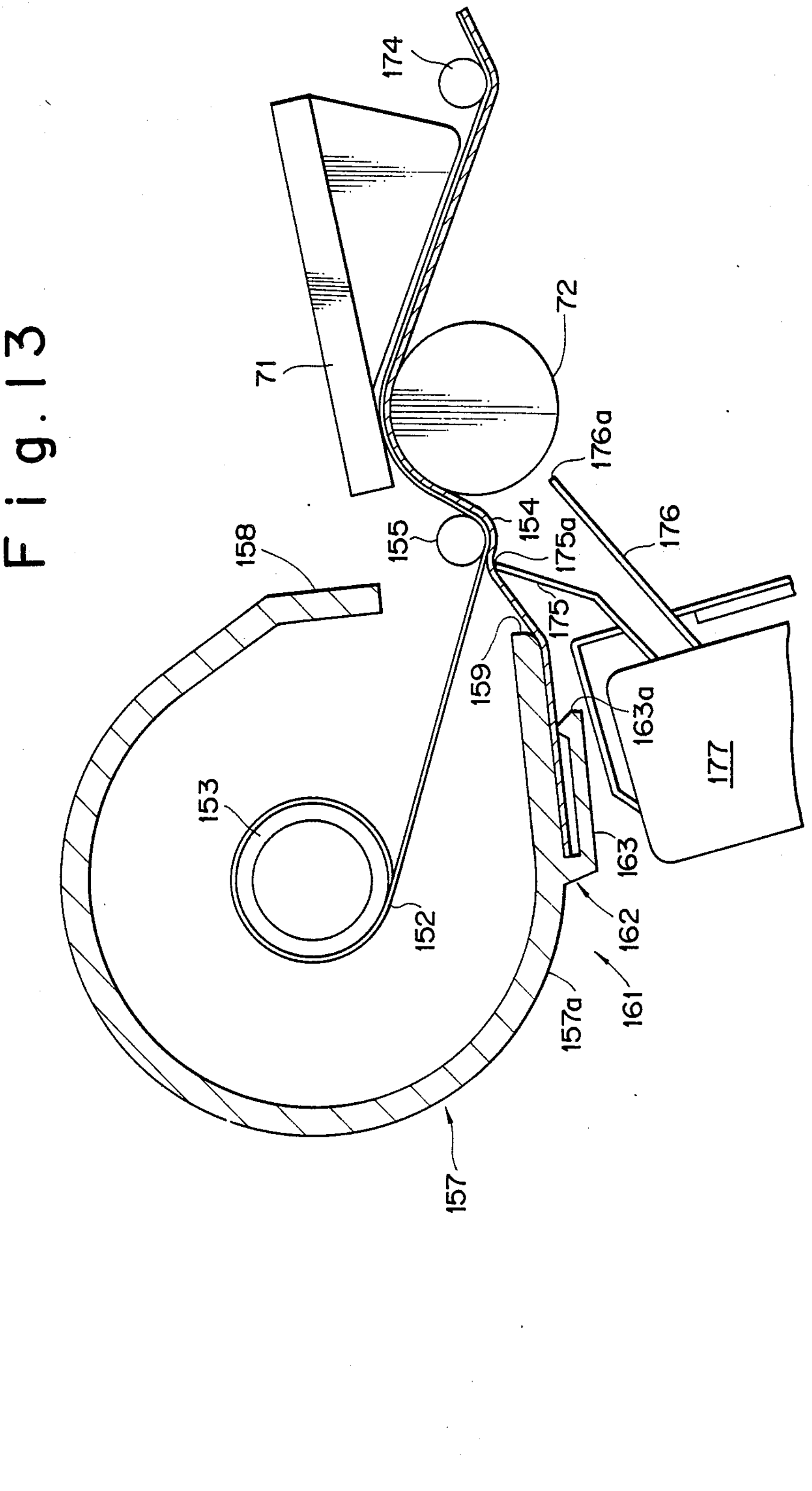
FIG. 13 is a schematic illustration showing the condition in which the ink sheet/recording paper cassette of FIG. 8 has been set in position in the recording station of the facsimile machine.

Then, when the upper half section 11*a* is pivotted closed by having it pivotted clockwise around the lower support shaft 35, the thermal print head 71 and the guide roller 174 are brought into the interior of the cassette case 151 via the top opening 158 and the thermal print head 71 is pressed against the platen roller 72. Then, when the upper half section 11*a* is locked to the lower half section 11*b*, the mounting of the ink sheet cassette 116 in position in the recording unit 17 is completed as shown in FIG. 13. Upon completion of mounting of the ink sheet cassette 116, a control signal is output from the control circuit 146 so that the stepping motor 182 is driven to rotate clockwise to thereby cause the platen roller 72 to rotate in the reversed direction. With this, the recording paper 154 in contact with the platen roller 72 is moved backward so that the leading portion of the recording paper 154 is moved away from the holding unit 161. This is because, the frictional force between the platen roller 72 and the recording paper 154 is larger than the holding force for holding the recording paper 154 by the holding members 163.

Figure 14:
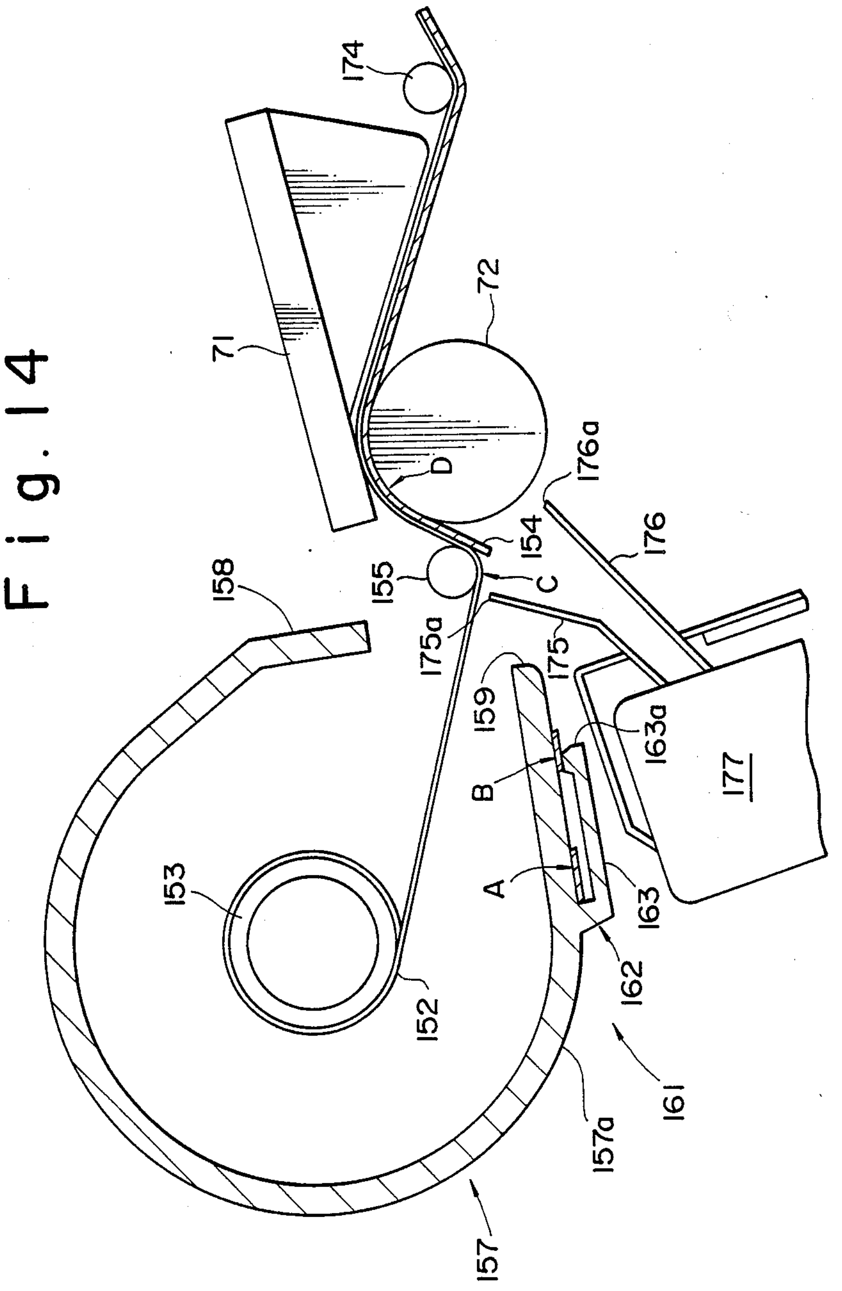
FIG. 14 is a schematic illustration showing the condition in which the recording paper is rewound after the ink sheet/recording paper cassette has been detachably mounted in position.
Figure 15:
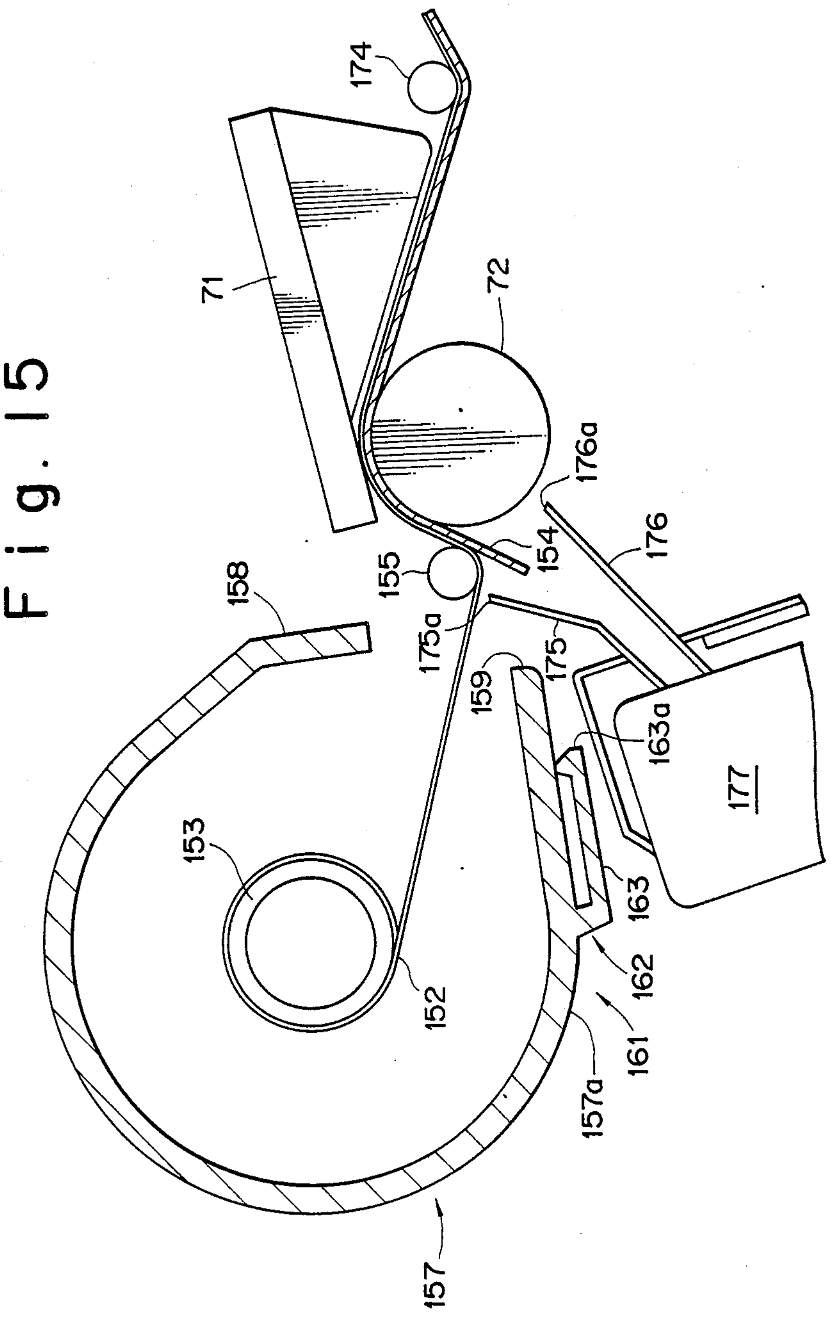
FIG. 15 is a schematic illustration showing the condition in which the recording paper is being supplied after the ink sheet/recording paper cassette has been detachably mounted in position.
Figure 16:
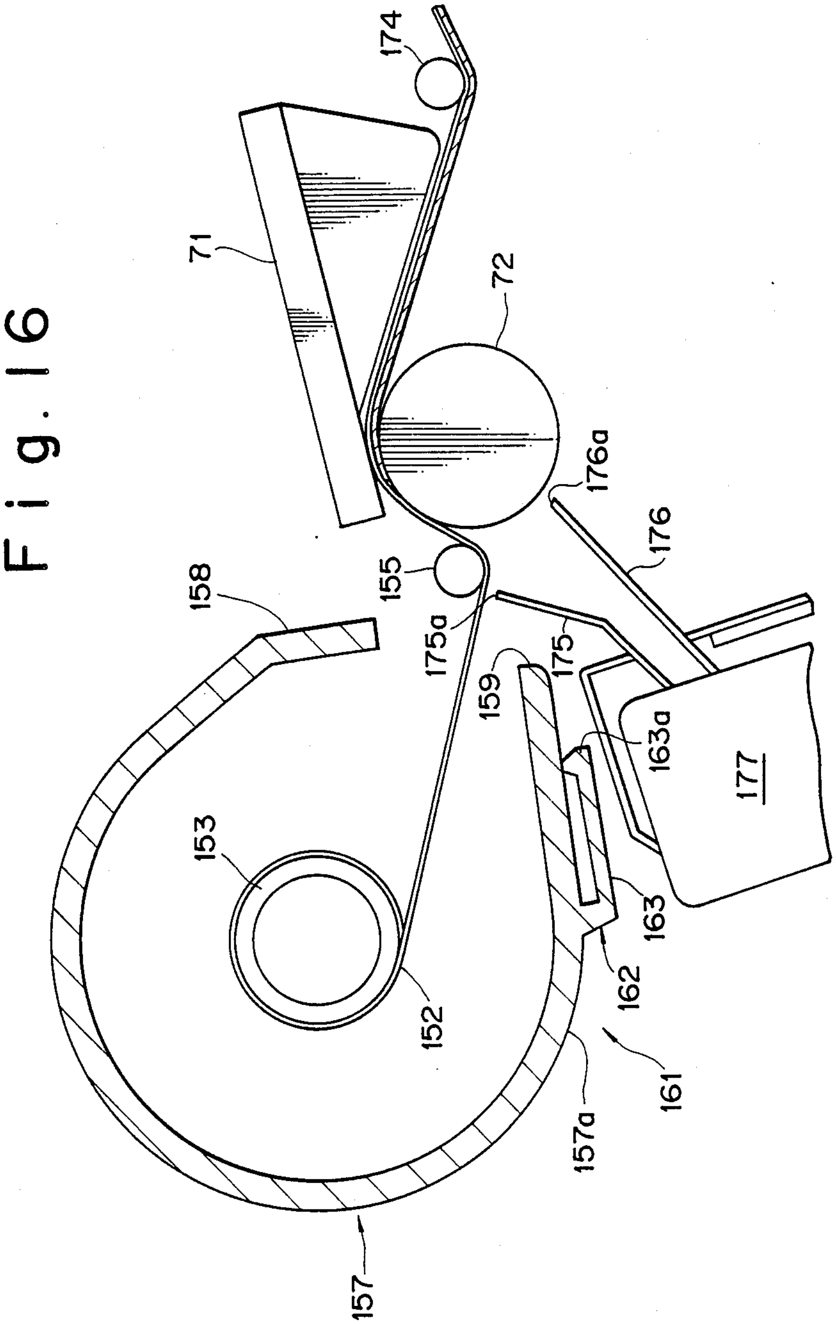
FIG. 16 is a schematic illustration showing how the leading portion of recording paper extends after the ink sheet/recording paper cassette has been detachably mounted in position.

As described above, in the present embodiment, since the leading portion of the recording paper 154 is regulated in position by the stopper side walls 162*b* of the stopper member 162, the recording paper 154 is moved backward as located in an intended position. The leading portion of the recording paper 154 separated away from the holding unit 161 moves backward over the top end 175*a* of the guide plate 175 until it reaches a location C in the vicinity of the guide roller 155 as shown in FIG. 14. That is, the distance between locations A and B shown in FIG. 14 is previously set as a predetermined amount of backward movement for the recording paper 154. When the leading portion of the recording paper 154 has been moved backward to location C, a control signal is output from the control circuit 146 so that the stepping motor 182 is driven to rotate counterclockwise to thereby cause the platen roller 72 to rotate. With this, the recording paper 154 is transported; however, since the leading portion of the recording paper 154 has been moved back to a location in the vicinity of location C close to the guide roller 155, the leading portion of the recording paper 154 moves linearly in the tangential direction at the contact with the guide roller 155 as shown in FIG. 15 so that the recording paper 154 is led into the cutter unit 177 as guided by the guide plates 175 and 176. When the recording paper 154 has been led into the cutter unit 177, a control signal from the control circuit 146 is temporarily interrupted to thereby halt the rotation of the platen roller 72, during which the recording paper 154 is cut to a predetermined size by the cutter unit 177. Upon cutting of the recording paper 154 by the cutter unit 177, a control signal is again output from the control circuit 146 to thereby rotate the platen roller 72 in the reversed direction once again. As a result, the leading portion of the recording paper 154 is moved back toward the thermal print head 171 from the cutting position in the cutter unit 177 to thereby define a leading margin of the recording paper 154 as shown in FIG. 16. The leading margin is preferably set in a range between 2 and 4 mm.

In accordance with the present embodiment, when a new ink sheet cassette 116 is mounted in position in the recording unit 17, a new roll of ink sheet 152 and a new roll of recording paper 154 are set in position at the same time. Besides, if a thermal transfer recording mode is to be changed to a heat-sensitive recording mode or if the ink sheet cassette 116 is temporarily detached from the recording unit 17, for example, for maintenance operation or the like, the operator may put the leading portion of the recording paper 154 into the holding unit 161 to thereby properly position the leading portion of the recording paper 154 by the stopper member 162. When the ink sheet cassette 116 has been mounted in position in the recording unit 17, the leading portion of the recording paper 154 is not necessarily held at location A shown in FIG. 14. For example, there may be a case in which the leading portion of the recording paper 154 is held at location B. However, since the backward movement of the recording paper 154 has been previously determined, the leading portion of the recording paper 154 when moved backward will be located further upstream of location C with respect to the direction of advancement of the recording paper 154. Nevertheless, in accordance with the present embodiment, since the distance between locations A and B is set to be smaller as compared with the distance of backward movement of the recording paper 154, even if the recording paper 154 is moved backward from location B, the leading portion of the recording paper 154 will be located, for example, at location D. Since there is an enough distance between location D and the recording position, no problem arises in the transportation of the recording paper 154. Besides, since the leading portion of the recording paper 54 is held by the holding unit 161, the handling of the ink sheet cassette 116 is extremely eased. If there is a slack in the recording paper 154 with its leading portion held by the holding unit 161, this slack may be easily removed by rotating the knob 170*a* manually.

Figure 17:
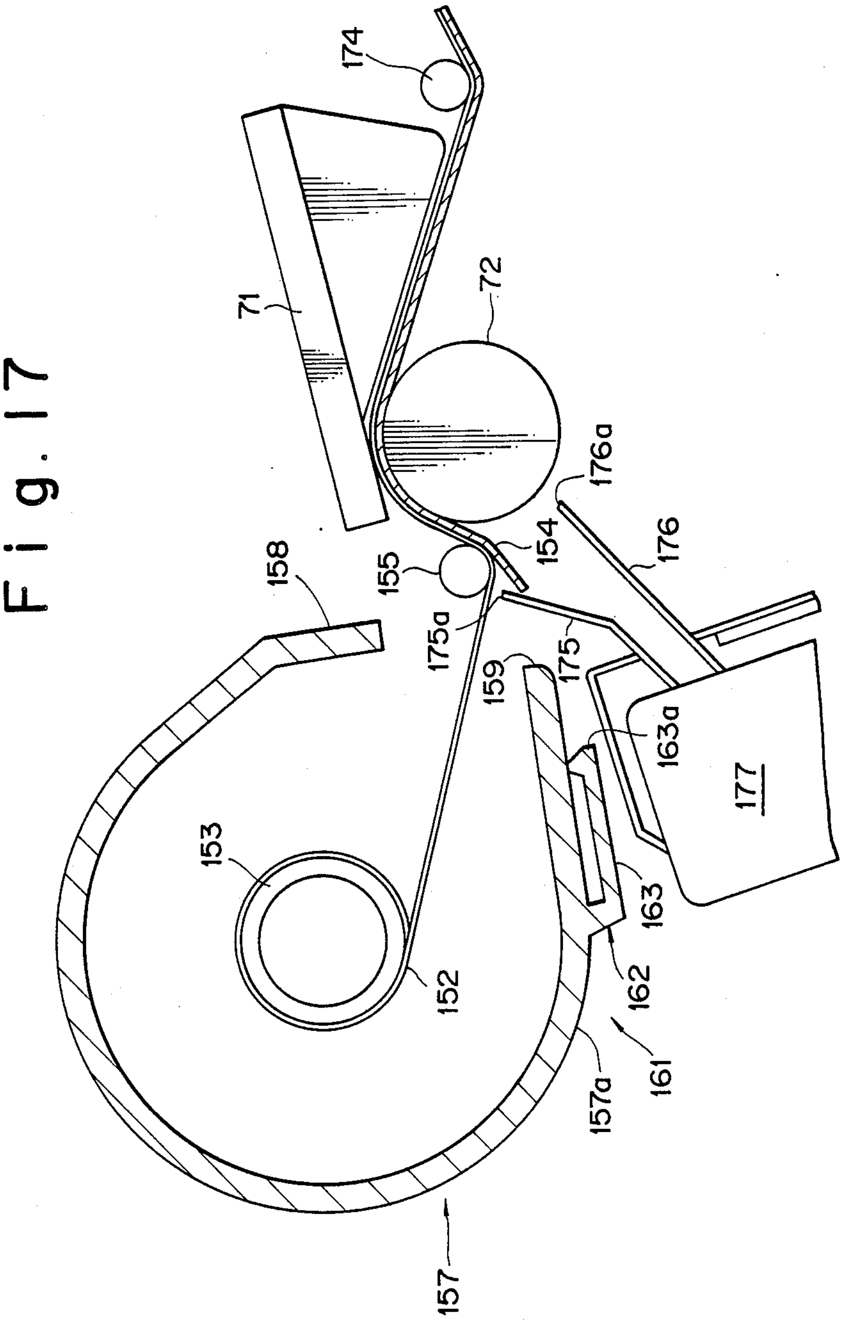
FIG. 17 is a schematic illustration showing the relative positional relationship among the ink sheet, recording paper and the guide roller provided in the ink sheet/recording paper cassette when it has been detachably mounted in position.
Figure 18:
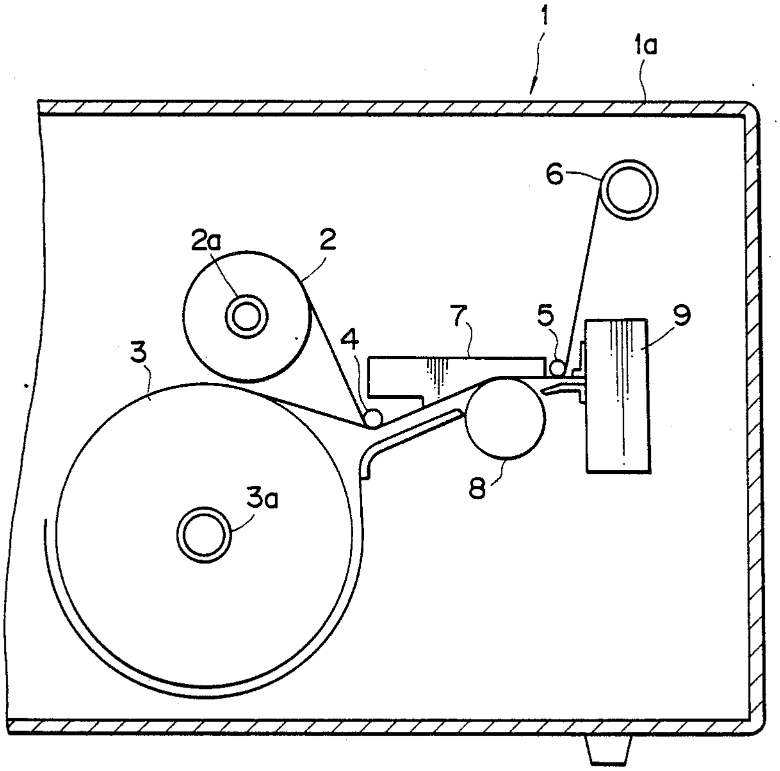
Fig. 18 PRIOR ART
FIG. 18 is a schematic illustration showing a typical prior art facsimile machine having a thermal transfer type recording unit.

Since the ink sheet 152 and the recording paper 154 are in intimate contact when recording is carried out as sandwiched between the thermal print head 71 and the platen roller 72 and the ink layer of the ink sheet 152 is partly melted and transferred to the recording paper 154 according to a heat pattern defined by the thermal print head 71, the ink sheet 152 and the recording paper 154 are affixed together when they are transported to the location where the guide roller 155 is disposed. However, in accordance with the present embodiment, the ink sheet 152 is separated from the recording paper 154 toward the take-up spool 153 at the guide roller 155 with the recording paper 154 guided into the cutter unit 177 from the guide roller 155. That is, when the ink sheet 152 and the recording paper 154 are transported to the guide roller 155, the ink sheet 152 passes around the peripheral surface of the guide roller 155 at an acute angle to be wound around the take-up spool 153; on the other hand, since the recording paper 154 has a leading margin, the recording paper 154 tends to move linearly in the tangential direction tangent to both of the platen roller 72 and the guide roller 155. Furthermore, since the recording paper 154 moves downward, the weight of the recording paper 154 contributes to pull the recording paper 154 further away from the ink sheet 152. And, then, further recording is carried out and when a recorded portion of the recording paper 154 has reached the guide roller 155, the recording paper 154 tends to be pulled toward the take-up spool 153 because of sticking between the recording paper 154 and the ink sheet 152. In this case, however, as shown in FIG. 17, the leading portion of the recording paper 154 comes into contact with the guide plate 175 and is guided in advancement by the guide plate 175. Accordingly, a separating force is applied between the ink sheet 152 and the recording paper 154 so that the recording paper 154 is positively separated away from the ink sheet 152. With still further recording, the ink sheet 152 is more wound around the take-up spool 153 and the recording paper 154 is more transported into the cutter unit 177 as guided between the guide plates 175 and 176. Upon completion of recording of one page of image information, the recording paper 154 is further transported over a predetermined distance from a recording end position and thereafter the recording paper 154 is cut to a predetermined size by the cutter unit 177. Upon cutting of the recording paper 154, a control signal is output from the control circuit 146 so that the stepping motor 182 is driven to rotate clockwise to cause the platen roller 72 to rotate in the reversed direction. Thus, the leading edge of the recording paper 154 is moved backward from the cutting position of the cutter unit 177 toward the thermal print head 71 to thereby define a leading margin of the recording paper 154 for the next cycle of recording operation.

It is to be noted that the rest of operation of the present embodiment is similar to that of the previous embodiment described with reference to FIGS. 4*b* and 5*b*. Thus, a reference should be made to the description with reference to FIGS. 4*b* and 5*b* for fuller understanding of the present embodiment. As described above, in accordance with the present embodiment, the roll of ink sheet 152, the roll of recording paper 154, the take-up spool 153 and the separation guide roller 155 are provided in the single cassette case 151 so that all of these elements are set in position at the same time simply by setting the cassette case 151 in position. Thus, replenishment of expendable supplies, such as a roll of ink sheet and a roll of recording paper, can be carried out extremely easily and smoothly without damaging the ink sheet or the recording paper and without producing a slack when set in position. In addition, in accordance with the present embodiment, since the separation guide roller 155 for separating the recording paper 154 from the ink sheet 152 is provided integrally within the cassette case 151 and the separation guide roller 155 is provided that it is located in the vicinity of the entrance end 175*a* of the guide plate 175 when set in position in the recording unit 17, the recording paper 154 can be securely separated from the ink sheet 152 even if a leading margin defined in the recording paper 154 is relatively small.

In the above-described embodiments, both of a roll of an ink sheet and a roll of recording paper are provided in an ink sheet cassette; however, as an alternative embodiment, one or more features of the present invention may be applied to the case in which an ink sheet cassette contains only a roll of an ink sheet and not a roll of recording paper.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink sheet cassette comprising:

a case;

a first roll of an ink sheet contained in said case, said ink sheet having thereon a thermally transferrable ink layer;

a second roll of recording paper contained in said case; and a take-up spool rotatably supported in said case for winding said ink sheet supplied from said first roll after having been used for recording information on said recording paper supplied from said second roll.

2. The cassette of claim 1, further comprising first supporting means for supporting said first roll rotatably, said first supporting means including a tension applying means for applying a tension to said ink sheet when pulled by said take-up spool to be wound therearound.

3. The cassette of claim 1, wherein said case is formed with a pair of opposite openings through which a recording unit may partly move into said cassette to hold said ink sheet and said recording paper at a predetermined recording position.

4. The cassette of claim 3, wherein said base is formed with a detection opening through which a detector for detecting the end of said ink sheet may detect an end mark provided on said ink sheet.

5. The cassette of claim 1, wherein said take-up spool is provided with a first engaging means for engaging with a second engaging means provided in a recoding apparatus in which said cassette may be detachably mounted, whereby a driving force is transmitted to said take-up spool through an engagement between said first and second engaging means when said cassette is set in position in said recording apparatus.

6. The cassette of claim 5, wherein said first engaging means includes a gear fixedly attached to said take-up spool and located outside of said case.

7. An ink sheet cassette comprising:

a case, a first roll of an ink sheet contained in said case, said ink sheet having a thermally transferrable ink layer, a second roll or recording paper contained in said case;

taking up means mounted in said case for taking up said ink sheet after said ink sheet has been supplied from said first roll and used for recording on said recording paper supplied from said second roll at a recording position where said ink sheet is brought into contact with said recording paper which is transported along a predetermined transportation path; and separating means mounted in said case for positively separating said ink sheet from said recording paper after said ink sheet and said recording paper have moved past said recording position.

8. The cassette of claim 7 wherein said taking up means includes a take-up spool which is rotatably mounted in said case with a leading end of said ink sheet fixedly attached to said take-up spool.

9. The cassette of claim 7 wherein said separating means includes a guide roller mounted in said case.

10. The cassette of claim 9 wherein said guide roller is rotatably mounted in said case.

11. An ink sheet cassette comprising:

a case;

a first roll of an ink sheet contained in said case, said ink sheet having thereon a thermally transferrable ink layer;

a second roll of recording paper contained in said case;

taking up means mounted in said case for taking up said ink sheet supplied from said first roll after having been used for recording information on said recording paper supplied from said second roll; and holding means formed on said case for temporarily holding a leading portion of said recoding paper.

12. The cassette of claim 11 wherein said holding means includes a first positioning means for positioning said leading portion of said recording paper in a lengthwise direction of said recording paper and a second positioning means for positioning said leading portion of said recording paper in a transverse direction of said recording paper when said leading portion of said recording paper is held by said holding means.

13. The cassette of claim 12 wherein said first positioning means includes a stopper end wall formed in said case extending in a widthwise direction of said recording paper and said second positioning means includes at least one stopper side wall formed in said case to be engageable with a side of said leading portion of said recording paper when held by said holding means 14. A recording apparatus for use with an ink sheet cassette, wherein said ink sheet cassette comprising:

a case;

a first roll of an ink sheet contained in said case, said ink sheet having thereon a thermally transferrable ink layer;

a second roll of recording paper contained in said case; and a take-up spool rotatably mounted in said case for taking up said ink sheet supplied from said first roll after having been used for recording information on said recording paper supplied from said second roll; and said recording apparatus comprising:

holding means for detachably holding said ink sheet cassette in position;

a thermal print head engageable with said ink sheet when said ink sheet cassette is set in position;

a platen roller pressed against said thermal print head with said ink sheet and said recording paper sandwiched therebetween;

driving means for driving to rotate said platen roller;

first power transmitting means for transmitting only a normal rotation of said platen roller to said take-up spool; and second power transmitting means for transmitting only a reversed rotation of said platen roller to said take-up spool.

15. The apparatus of claim 14 wherein each of said first and second power transmitting means includes a one-way clutch mechanism.

* * * * *